United States Patent [19]

Tasaki et al.

[11] Patent Number: 4,933,684

[45] Date of Patent: Jun. 12, 1990

[54] APPARATUS AND METHOD FOR PREVENTING CONDENSATION IN AN INK JET RECORDING DEVICE HAVING HEATERS FOR HEATING A RECORDING HEAD AND A RECORDING MEDIUM AND A HUMIDITY DETECTOR FOR DETECTING HUMIDITY IN A RECORDING AREA TO PREVENT CONDENSATION FROM FORMING

[75] Inventors: Shigemitsu Tasaki; Atsushi Noda, both of Kawasaki, Japan

[73] Assignee: Canon Kabushiki Kaisha, Tokyo, Japan

[21] Appl. No.: 242,916

[22] Filed: Sep. 12, 1988

[30] Foreign Application Priority Data

| | | | |
|---|---|---|---|
| Sep. 11, 1987 | [JP] | Japan | 62-226626 |
| Sep. 11, 1987 | [JP] | Japan | 62-226629 |
| Sep. 11, 1987 | [JP] | Japan | 62-226630 |
| Sep. 9, 1988 | [JP] | Japan | 63-224576 |

[51] Int. Cl.[5] .......................... G01D 15/16; B41J 3/04

[52] U.S. Cl. .......................................... 346/1.1; 346/25; 346/140 R; 73/336

[58] Field of Search .................... 346/140, 75, 25, 1.1, 346/139 C; 73/336, 336.5; 400/126, 719

[56] References Cited

U.S. PATENT DOCUMENTS

| | | | |
|---|---|---|---|
| 4,176,363 | 11/1979 | Kasahara | 346/140 |
| 4,340,893 | 7/1982 | Ort | 346/1.1 |
| 4,429,321 | 1/1984 | Matsumoto | 346/140 R |
| 4,469,026 | 9/1984 | Irwin | 400/126 X |
| 4,559,543 | 12/1985 | Toganoh et al. | 346/140 R |
| 4,660,056 | 4/1978 | Yokoi | 346/140 |

FOREIGN PATENT DOCUMENTS

| | | |
|---|---|---|
| 0025878 | 4/1981 | European Pat. Off. . |
| 13445 | 1/1982 | Japan . |

*Primary Examiner*—Joseph W. Hartary

*Attorney, Agent, or Firm*—Fitzpatrick, Cella, Harper & Scinto

[57] ABSTRACT

An ink jet recording apparatus and method for preventing condensation from forming in a recording area having heaters for heating a recording head and a recording medium, a humidity detector for detecting the humidity in the recording area and a controller for controlling the temperature of the heaters in response to the humidity detected by the humidity detector. The controller decreases the temperature difference between the recording head and the recording medium by adjusting the heaters in order to lower the humidity in the recording area when it is higher than a predetermined value. If the humidity in the recording area is not controlled the quality of the recording will be impaired.

71 Claims, 23 Drawing Sheets

APPARATUS AND METHOD FOR PREVENTING CONDENSATION IN AN INK JET RECORDING DEVICE HAVING HEATERS FOR HEATING A RECORDING HEAD AND A RECORDING MEDIUM AND A HUMIDITY DETECTOR FOR DETECTING HUMIDITY IN A RECORDING AREA TO PREVENT CONDENSATION FROM FORMING

BACKGROUND OF THE INVENTION

1. Field of the Invention

The present invention relates to an ink jet recording apparatus, and more particularly to an ink jet recording apparatus provided with a fixing heater for accelerating the fixation of ink deposited as a recorded image on a recording medium.

2. Related Background Art

The ink jet recording apparatus are attracting increasing attention in the field of recording apparatus, because of various advantages such as a very low noise level when recording and a capability of a a high density recording.

Also the ink jet recording apparatus has an advantage that it can use plain paper as the recording medium, but the fixation of the ink on a recording paper may be difficult depending on the combination of the recording sheet to be employed and the ink. Since the ink jet recording apparatus employs liquid ink as the recording material, the ink may not penetrate rapidly into the recording medium and therefore remain in liquid state thereon if the recording medium shows insufficient absorption to the ink.

In such a situation there may result smear by the transport members such as rollers, and said smear may be transferred to the succeeding recording medium, thereby significantly deteriorating the quality of recording. Also, in case of using a recorded sheet on which the ink is not sufficiently fixed not only a problem of smearing by the operator's hands but also a problem of ink spreading due to erroneously rubbing the image would be caused. Thus, the image quality is deteriorated. Such a drawback of smearing and spreading may also occur due to the mutual friction of the recorded media when the recorded media are stacked on a discharge tray.

In order to prevent such drawbacks and to facilitate the fixation of ink to the recording medium, there has been proposed to heat the recording medium with a heater, thereby accelerating the evaporation of water contained in the ink and thereby rapidly dry the ink on the recording medium. For the purpose of shortening the transport path of the recording medium and preventing the smear on the transport members, such a fixing heater is provided in the vicinity of the recording position of the recording head, for example in a platen for supporting the recording medium so that its recording surface would be flat in front of the recording head. Also said heater may be positioned at the upstream side of said recording position in the transport path for preheating the recording medium, since the ink absorption is enhanced if the recording medium is dried in advance.

The deterioration of the recorded image quality may also be caused by dewing in the ink jet recording apparatus. Under certain circumferential conditions, the moisture condensed by dewing in the apparatus may adhere to the recording medium, causing ink blotting. Such problems resulting from dewing cannot be prevented by the use of a fixing heater.

In order to prevent such dewing, the present inventors have looked to a different technical area, the electrophotographic technology, and have considered the application of a dew-preventing device employed in electrophotographic copying machines to the ink jet recording apparatus. For example, they tried a method of controlling the heating operation of a plurality of heaters provided respectively with a plurality of temperature sensors, single humidity sensor, paper feeding section, optical unit and fixing unit as described in Japanese Patent Laid-Open No.55-35390, and a method of removing moisture by blower as described in Japanese Patent Laid-Open No.56-80061 in addition to the above described heat control method.

However, these methods involve certain obstacles when simply applied to the ink jet recording apparatus, such as (1) the apparatus inevitably becomes bulky because of the use of plural antidewing heaters in addition to the fixing heater, and (2) the viscosity of the ink is influenced by the heat from the antidewing heaters so that the stability of the recording property is lowered. The experiments of the present inventors have revealed the cause and influence of dewing in the ink jet recording apparatus in the following manner.

In the ink jet recording apparatus, rapid and satisfactory fixation without warping in the recording medium is generally achieved, according to the experiments of the present inventors, in a temperature range of the recording medium of 80° to 60° C.

On the other hand, the recording head is maintained at 20° to 40° C. in consideration of the parameters influencing the stability of ink emission such as ink viscosity. This temperature is lower than the circumferential temperature.

Under such conditions, the face of the ink emission orifices of the recording head (hereinafter called emission surface) may cause dewing, because a high humidity atmosphere is created around the recording head, particularly in the vicinity of the emission surface, due to water evaporation from the recording medium and from the ink by heating for fixing.

In ink jet recording, it is generally important that the ink droplet is deposited at a desired position, in order to improve the image quality, and, for this purpose, it is required that the ink droplets for use in recording have constant flying direction and speed of emission with a uniform size.

The dewing on the emisison, surface, in particular, at the peripheral of the emission orifice generates uneven water drops thereon at the peripheral of the orifices, exerting random attraction to the ink droplets leaving the ink orifices and thus causing fluctuation in the direction and speed of emission of the ink droplets and in the size thereof. These facts lead to deterioration of the recorded image quality. Also the wet emission surface induces deposition of paper dusts and other dusts, which leads to the deterioration of recorded image quality.

It has therefore been recognized that the dewing in the ink jet recording apparatus could only be resolved by careful consideration of the fixing temperature, temperature of recording head considering the result and extensive time of experiments.

SUMMARY OF THE INVENTION

In consideration of the foregoing, an object of the present invention is to provide a method of preventing dewing in the ink jet recording apparatus, which minimizes the dewing on the emission surface and thus stabilizes the direction and speed of emission of ink droplets and the size thereof, thereby preventing deterioration of the recorded image quality, and an ink jet recording apparatus achieving such method.

Another object of the present invention is to provide an ink jet recording apparatus having a recording head for emitting ink for image recording on a recording medium; heater means for heating the recording medium; humidity detector means for detecting the humidity in a recording zone formed by the recording head and the recording medium; and control means for controlling the temperature of the heater means according to the humidity detected by the humidity detector means.

Still another object of the present invention is to provide an ink jet recording apparatus having first heater means for preheating recorded area of the recording medium prior to image recording; second heater means for heating the recording medium after recording, thereby fixing the recorded image; humidity detector means for detecting the humidity in the vicinity of the zone of the recording medium being subjected to image recording; and control means for controlling the temperature of the first and second heater means according to the humidity detected by the humidity detector means.

Still another object of the present invention is to provide an ink jet recording apparatus with heater means for heating the recording medium for fixing the recorded image, comprising first humidity detector means for detecting the humidity of a zone in which the recording medium is subjected to image recording; second humidity detector means for detecting the ambient humidity outside the ink jet recording apparatus; and control means for controlling the temperature of the heater means according to the humidities detected by the first and second humidity detector means.

In the above-mentioned structure it is possible to control the heating temperatures of the recording head and the heating means for fixing at optimum level for the ink jet recording apparatus according to the humidity in the vicinity of recording zone, thereby preventing dewing, without an additional dew preventing device.

It is also possible to achieve image fixation without dewing, by appropriate temperature control of the recording medium before and after image recording.

It is furthermore possible to achieve appropriate temperature control of the fixing heater without dewing, in response to the humidity levels in the recording zone and in the ambient atmosphere.

DETAILED DESCRIPTION OF THE PREFERRED EMBODIMENTS

In one of the preferred embodiments of the present invention, the ink jet recording apparatus is equipped with at least one humidity detector means and at least one fixing heater means, wherein the heating temperature of said heater means is varied according to the humidity detected by said humidity detector means. It is also preferred to suitably vary the temperature of the recording head itself. More specifically, (1) if a high humidity is detected by the humidity detector means, the heating by the heater means is interrupted or adjusted to a temperature lower than the normal fixing temperature, thereby preventing rapid humidity rise and thus avoiding dewing; or (2) in such a situation the temperature of the recording head itself is brought to a temperature higher than the normal heating temperature, thereby reducing dewing tendency thereon. Besides, the combination of the above-mentioned methods (1) and (2) reduces the temperature difference between the temperature of the recording head and the temperature of the atmosphere therearound, thus preventing the dewing on the recording head or reducing it so that substantially no adverse effect would be caused.

The preferred temperature range for the heating means is not exceeding 80° C., more preferably from 60° to 80° C., and in that temperature region the recording head itself is suitably selected according to a kind and property of ink to be used, 20° to 40° C. is desirable for the region.

Though a temperature higher or lower than the above-mentioned ranges may be suitably selected, the temperature selection within said ranges is nevertheless desirable.

The present invention will now be clarified in greater detail by embodiments thereof shown in the attached drawings.

[First embodiment]

Figure 1:
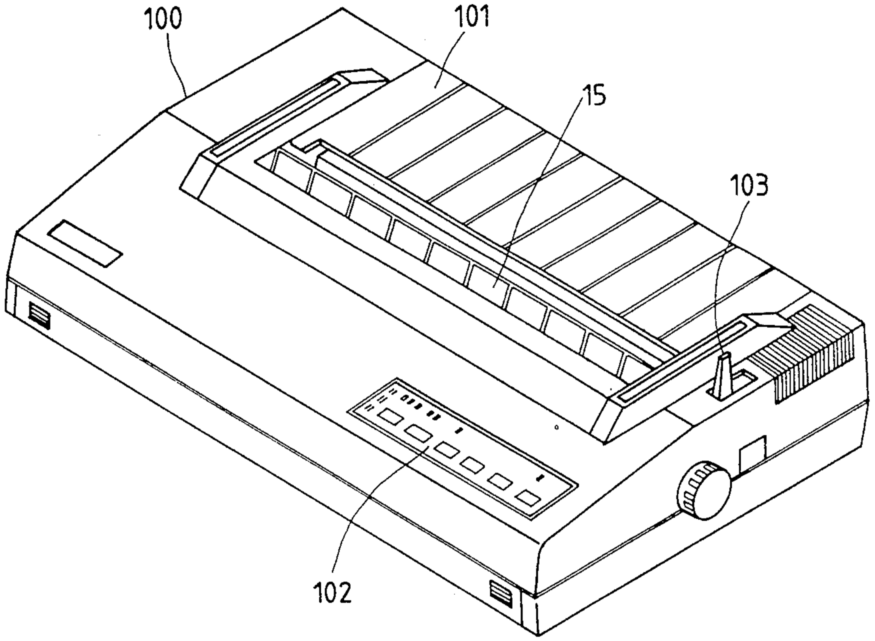
FIG. 1 is a schematic perspective external view of an ink jet recording apparatus preferred embodiment of the present invention.

FIG. 1 is a schematic external perspective view of an ink jet recording apparatus (hereinafter briefly called ink jet printer or printer) embodying the present invention, wherein shown are a main body 100; a sheet discharge guide member 15 constituting a part of a sheet discharge exit formed in the center of an upper cover of the printer 100; and a sheet discharge tray 101 formed in continuation with said discharge guide 15 and constituting a part of the upper cover, whereby a recording medium or sheet after image recording is discharged from the main body 100 while being guided by said discharge guide 15 and is placed on the tray 101.

An operation panel 102 formed in a part of the upper cover is provided with input keys for various operations to be explained later and indicator lamps for indicating the operation status of the printer. A sheet set lever 103 emerging through an aperture at an end of the upper cover actuates a sheet feeding mechanism to be explained in relation to FIGS. 2 and 3, for facilitating the sheet loading.

Figure 2:
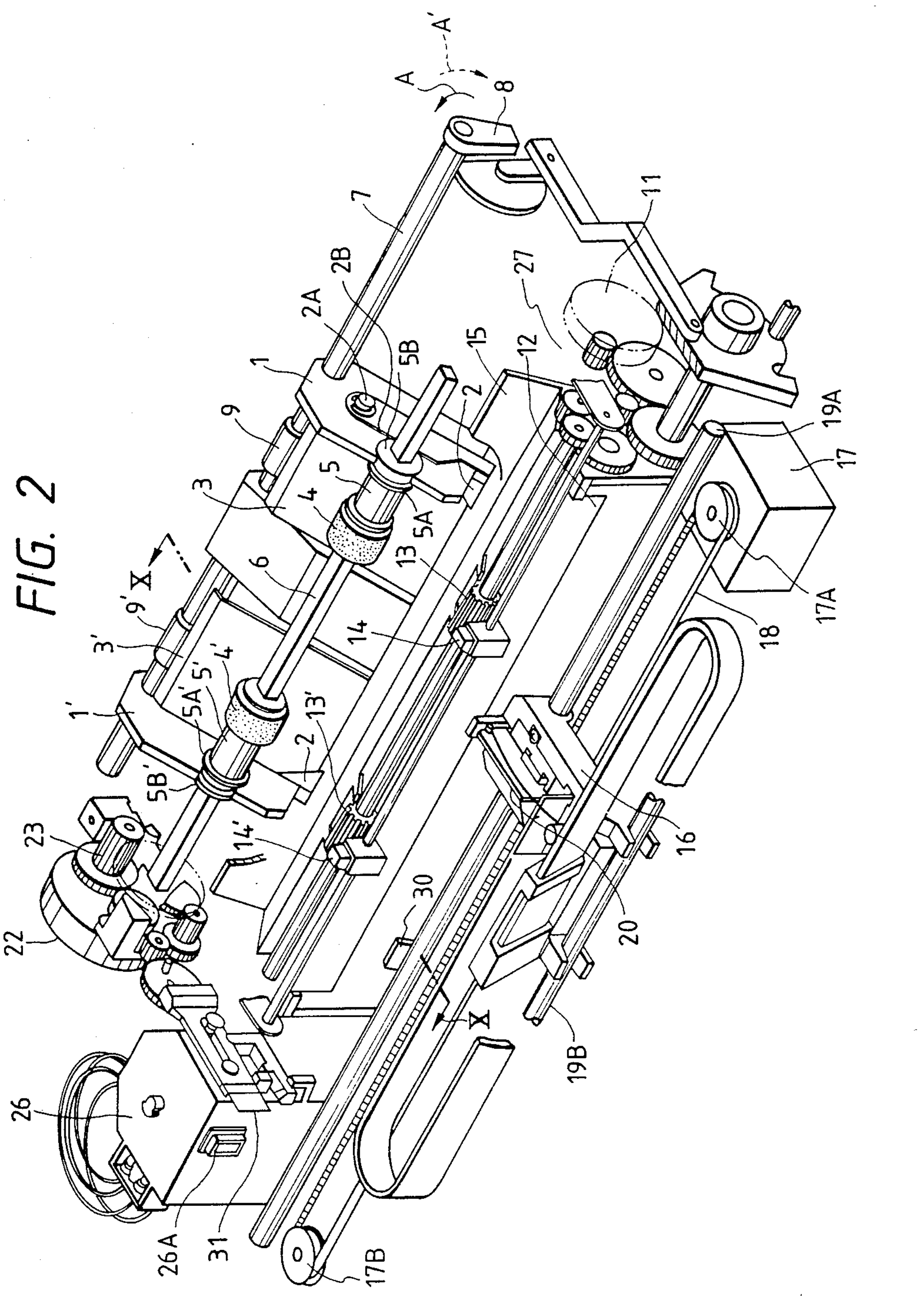
FIGS. 2 and 3 are respectively schematic perspective and cross-sectional side views of the ink jet recording apparatus of FIG. 1, without the outer casing.

FIG. 2 is a schematic perspective view of the printer shown in FIG. 1, without the outer casing.

Figure 3:
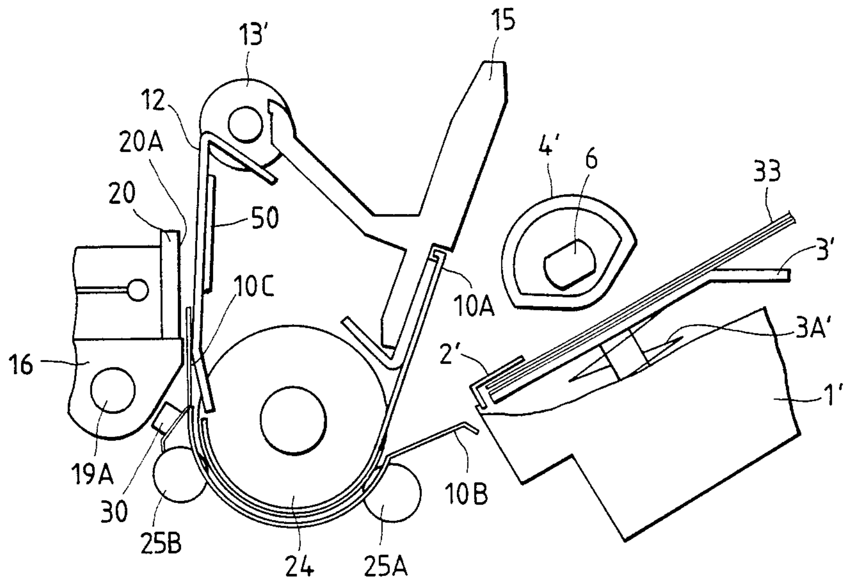

FIG. 3 is a schematic cross-sectional side view along a line X—X in FIG. 2.

In FIGS. 2 and 3, sliders 1, 1' constituting a part of a recording medium storing unit are slidably provided on a slider shaft 7, and are regulated in position corresponding to the width of the recording medium 33. Separating claws 2, 2' respectively provided on sliders 1, 1' separate the recording media 33 one by one in cooperation with separating rollers 4, 4'. Pressure plates 3, 3', constituting the bottom of the recording medium storing unit, are rotatably supported at an end thereof by shafts 1A, 1A' respectively provided on the sliders 1, 1', and are biased upwards by push-up springs 3A,3A' about said shafts 1A,1A', thereby enabling appropriate engagement of a separating roller shaft to be explained later and the recording media 33, regardless of the quantity thereof.

Link members 5, 5', slidable along the separating roller shaft 6, respectively support separating rollers 4, 4' and are respectively provided with connecting members 5A, 5B and 5A', 5B' for coupling with the sliders 1, 1'.

Thus the separating roller 4, link member 5 and connecting members 5A, 5B are integrally combined and are rendered slidable along the slider shaft 7 and the separating roller shaft 6. The separating roller 4', link members 5' and connecting members 5A', 5B' are similarly integrated.

In the above-explained structure, when the sliders 1, 1' are moved corresponding to the width of the recording medium 33, the separating rollers 4, 4' are similarly displaced on the separating roller shaft 6. Also the pressure plates 3, 3' and separating claws 2, 2', being combined with the sliders 1, 1', are likewise mounted by the displacement of the sliders 1, 1'.

A lever 8 is provided at an end of the slider shaft 7 for rotating the same. Pressure plate pressing arms 9, 9' are fixed on the slider shaft 7 for respective engagement with the pressure plates 3, 3', and rotate said pressure plates 3, 3' anticlockwise about the shafts 1A, 1A'in response to rotation in a direction A' of the slider shaft 7. The lever 8 is rotated in a direction A' by the actuation of the sheet set lever 103 mentioned above, whereby the arms 9, 9' depress the pressure plates 3, 3' against the biasing force of the springs 3A, 3A'. Consequently the pressure plates 3, 3' are respectively disengaged from the separating claws 2, 2', thereby facilitating the loading of the recording media 33.

An automatic sheet feed (ASF) motor 22 is coupled with an end of the separating roller shaft 6 through a transmission mechanism 23. The rotation of said ASF motor 22 is transmitted, through the transmission mechanism 23, to the separating roller shaft 6, whereby the separating rollers 4, 4' are rotated clockwise to separate and forward the recording media 33 one by one toward the sheet path in cooperation with the separating claws 2, 2'.

A sheet feed roller 24, shown in FIG. 3, is provided at a suitable position to which the recording media 33 is supplied by the separating rollers 4, 4'. Sheet guide members 10A, 10B are positioned substantially along the periphery of the sheet feed roller 24, with a gap therebetween, from an entrance position of the recording medium from the sliders 1 to a platen 12, and the gap formed by said sheet guide members 10A, 10B constitutes the path for the recording medium 33. A sheet press member 10C defines the movement of the recording medium 33 and maintains it in contact with the platen 12. Pinch rollers 25A, 25B are positioned in two points around the periphery of the sheet feed roller 24 and are maintained in contact with the sheet feed roller 24 through apertures provided in the sheet guide members 10A, 10B. They are biased by unrepresented springs and press the recording medium 33, supported inside the sheet guide members 10A, 10B, toward the sheet feed roller 24.

A sheet feed motor 11 is coupled to an end of the sheet feed roller 24 through a transmission mechanism 27. Thus the rotation of said motor is transmitted through the transmission mechanism 27 to the sheet feed roller 24 which is thus rotated to advance the recording medium 33.

A platen 12, defining a flat recording surface for the recording head, is positioned above the sheet feed roller 24 and is extended over the entire width of the recording medium 33. It is made of a metal but it can also be composed of rubber or plastics. Sheet discharge rollers 13, 13' are positioned at the downstream side of the platen 12 along the sheet path, and sheet sensors 14, 14' are positioned respectively corresponding to the sheet discharge rollers 13, 13', for detecting the setting, transportation and discharge of the recording medium 33. By means of the above-mentioned structure of the platen 12 and the discharge rollers 13, 13', the recording medium 33 after recording is discharged to the upper part of the printer 100, and is guided onto the tray 101 through sheet discharge guide 15.

A fixing heater 50 is mounted on a face of the platen 12 opposite to the face thereof contacting the recording medium 33. The fixing heater 50 heats the platen 12, of which heat is transmitted to the recording medium 33 thereby drying the recording medium 33 itself or the ink thereon after recording.

A recording head 20 is provided with nozzles, constituting ink emitting orifices, in opposed position to the recording face of the recording medium 33 defined in position by the platen 12. In suitable positions in the ink paths communicating with said nozzles, there are provided, as means for generating energy for ink emission, electrothermal converting elements for generating thermal energy or electromechanical converting elements for generating mechanical vibration energy. In the use of the former, thermal energy is applied to the ink in response to the drive signals, thereby causing a state change in the ink and inducing ink emission from the orifices at the end of the ink paths.

In the present embodiment it is preferred to use such a recording head. There may however be employed a recording head which is integral with an ink tank and is detachably mounted on the carriage, or a full-line recording head having the width of a line.

A carriage 16, supporting the recording head 20, is fixed to a driving belt 18 and is rendered slidable on two guide shafts 19A, 19B positioned parallel to the platen 12, whereby the recording head 20 can reciprocate over the entire width of the recording sheet 33.

A head driving motor 17 is provided in the vicinity of an end of the reciprocating path of the recording head 20 and is provided with a driving pulley 17A. Another pulley 17B is positioned at the other end of the reciprocating path of the recording head 20, and the belt 18 is supported by said pulleys 17A, 17B. The rotation of the head driving motor 17 is converted into linear motion by the belt 18 and is transmitted to the carriage 16 coupled with said belt 18, whereby the recording head 20 can reciprocate in the transversal direction of the recording medium 33.

A head recovery device 26 is provided at an end of the moving path of the recording head 20 outside the recording range, for example at a home position, and can perform a capping operation for protecting the recording head 20 with a cap member 26A, and an operation of retracting said cap member from the moving path of the recording head 20, in response to the function of the ASF motor 22, through a suitable structure of the transmission mechanism 23. Simultaneous with the capping of the recording head 20 with the head recovery device 26, there can be conducted an emission recovering operation, for example by forced removal of the viscous ink from the nozzles, by means of ink suction with suitable suction provided in the head recovery device 26 or ink pressurizing with suitable pressurizing means provided in the ink paths to the recording head 20. Also at the end of the recording operation, the recording head can be protected by said capping.

A wiper member 31 composed of a silicone rubber blade is provided on a lateral face of the head recovery device 26 so as to be engageable with the emission surface of the recording head 20, and engages with or is disengaged from the recording head 20 in response to the function of the ASF motor 22, again through a suitable structure of the transmission mechanism 23. Thus, at a suitable time in the course of the reciprocating motion of the recording head 20, or after the emission recovering process by the head recovery device 26, said blade 31 is made to protrude in the moving path of the recording head 20, thus wiping off the ink overflowing from the nozzles, in the course of the reciprocating motion of the recording head 20. The mechanism for separating and feeding the recording media 33, the structure of the transmission mechanism 23 for effecting the capping and wiping operation with a single motor 22, and the structure for effecting the separating and feeding of recording media and the driving of a pump provided as suction means for generating a negative pressure in the head recovery device 26 by means of a single motor, can rely on the structure disclosed by the present application example in the Japanese patent applications 61-81637 and 61-197201.

A humidity sensor 30, for detecting the humidity in the recording zone at the upstream side of the recording head 20 in the sheet path, is provided on the sheet guide 10B extended below the platen 12, in the vicinity of the recording zone.

[2nd Embodiment]

Figure 5:
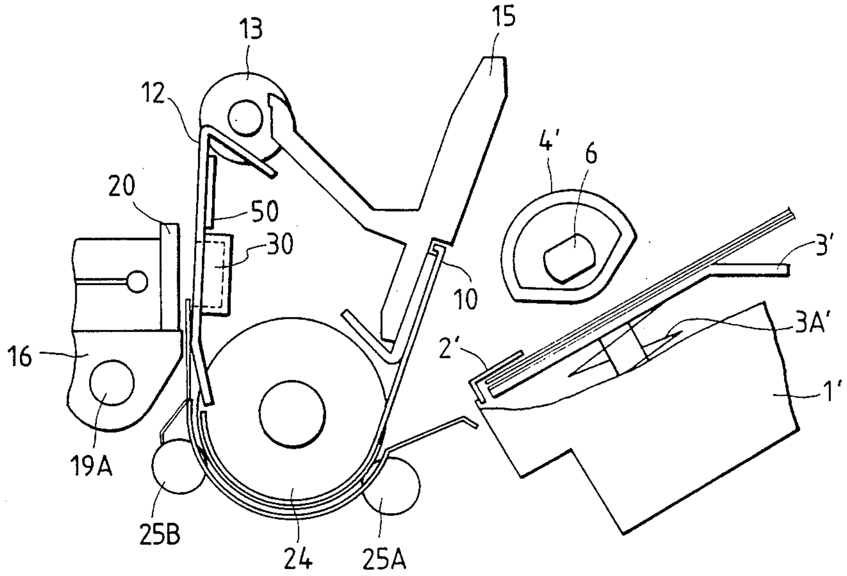
FIGS. 4 and 5 are respectively schematic perspective and cross-sectional views of an ink jet printer in which a humidity sensor, shown in FIGS. 1, 2, and 3, is provided on the platen of another preferred embodiment of the present invention.
Figure 4:
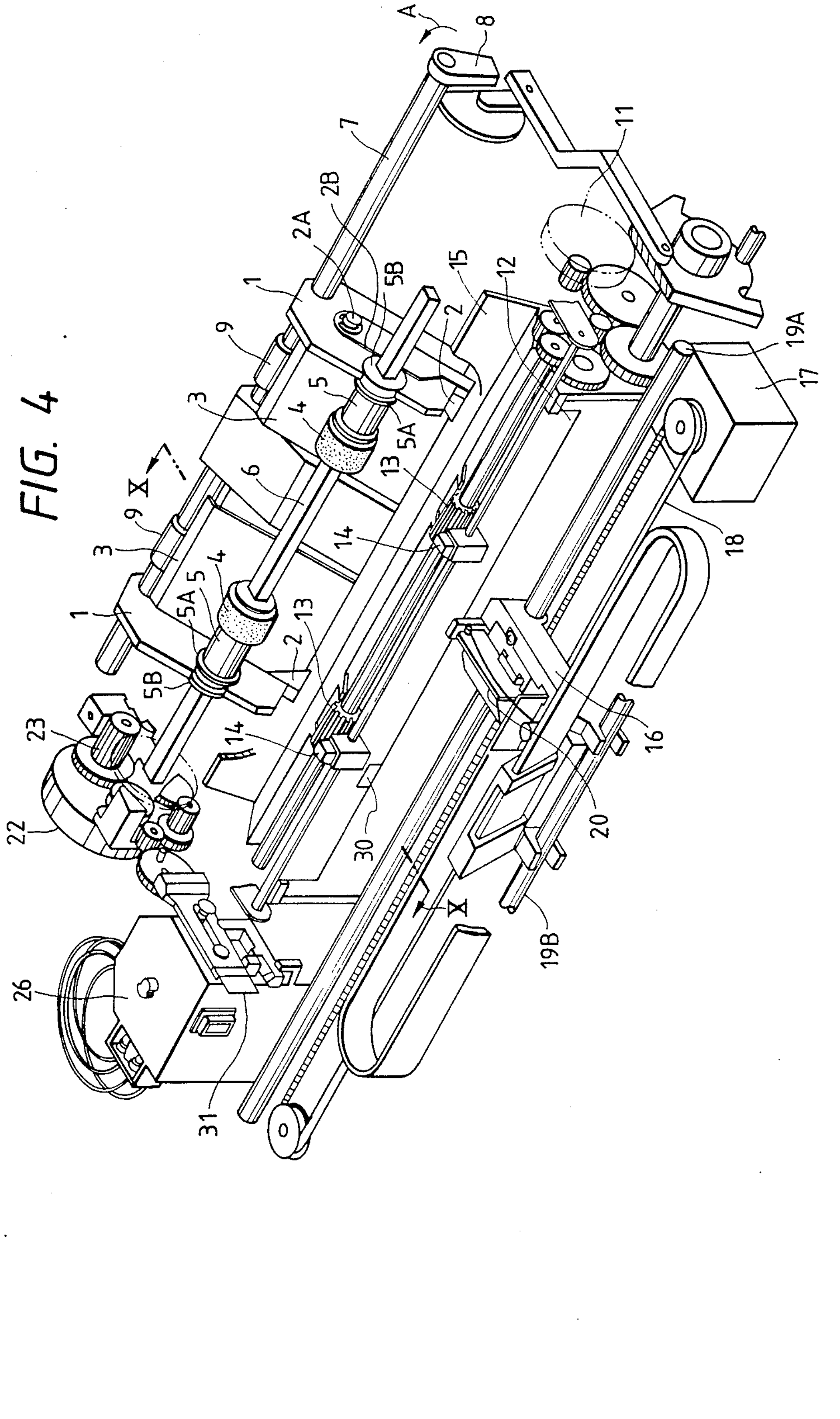

FIGS. 4 and 5 are respectively a schematic perspective view and a schematic cross-sectional view of a printer in which the humidity sensor is positioned on a part of the platen in the vicinity of the recording zone, wherein the same components as those in FIGS. 2 and 3 are represented by the same numbers and will not be explained further according to second preferred embodiment.

As shown in FIGS. 4 and 5, the humidity sensor 30 is embedded in the platen 12, at a position corresponding to the orifices of the recording head.

[3rd Embodiment]

Figure 6:
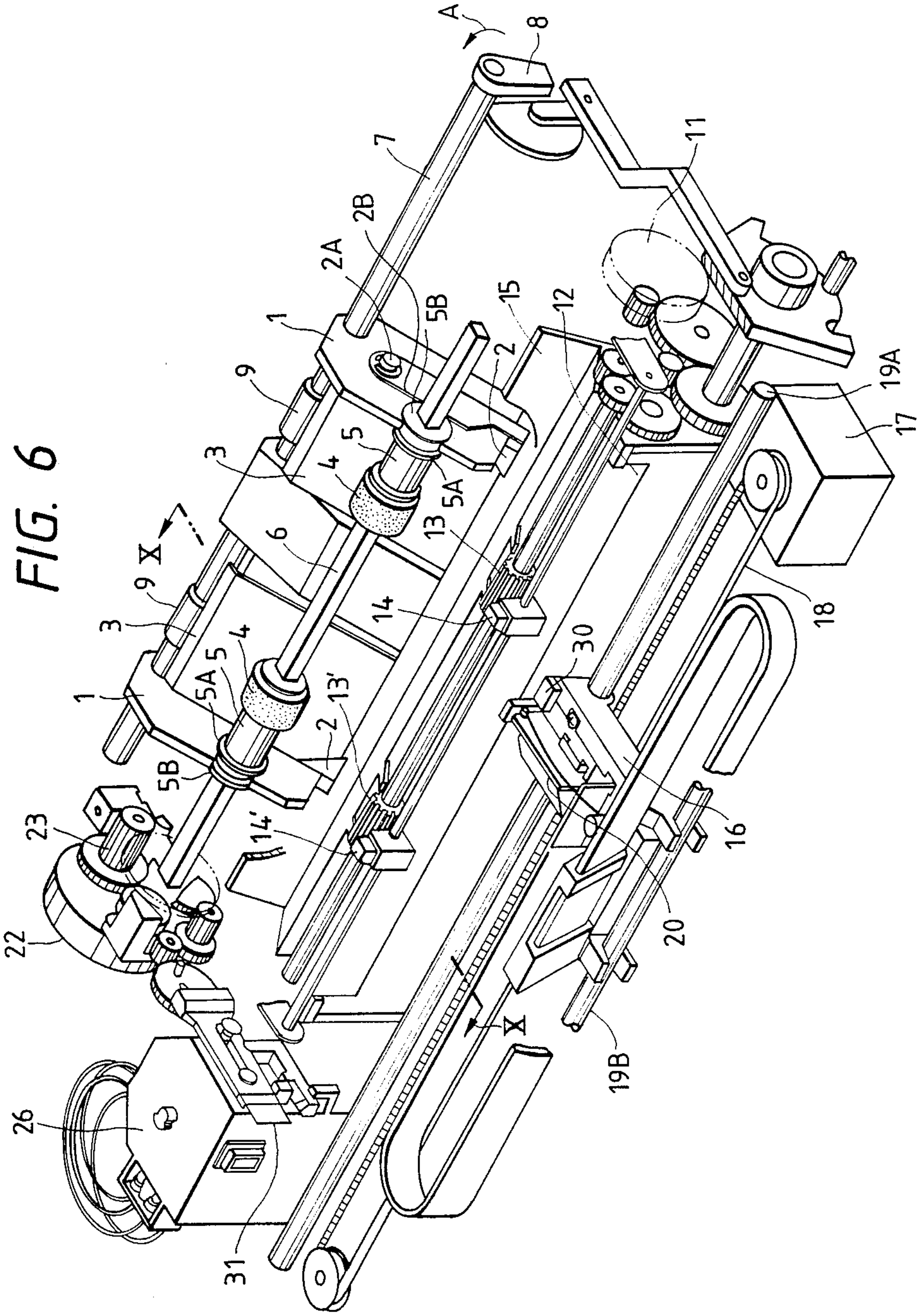
FIG. 6 is a schematic perspective view of ink jet printer in which the humidity sensor, shown in FIGS. 1, 2 and 3, is provided on the carriage according to still another embodiment of the present invention.

FIG. 6 is a schematic perspective view of a printer in which the humidity sensor is provided on the carriage, as a part of the recording zone. In FIG. 6, the same components as those in FIG. 2 are represented by the same numbers and will not be explained further.

As explained in the foregoing example, the humidity sensor 30 is not limited in its position but can be located at any position where the humidity can be detected. However, it is preferable for a further excellent embodiment, as explained in the foregoing example, to place said sensor in the vicinity of the recording zone where the emitted ink is deposited on the recording medium.

Figure 7:
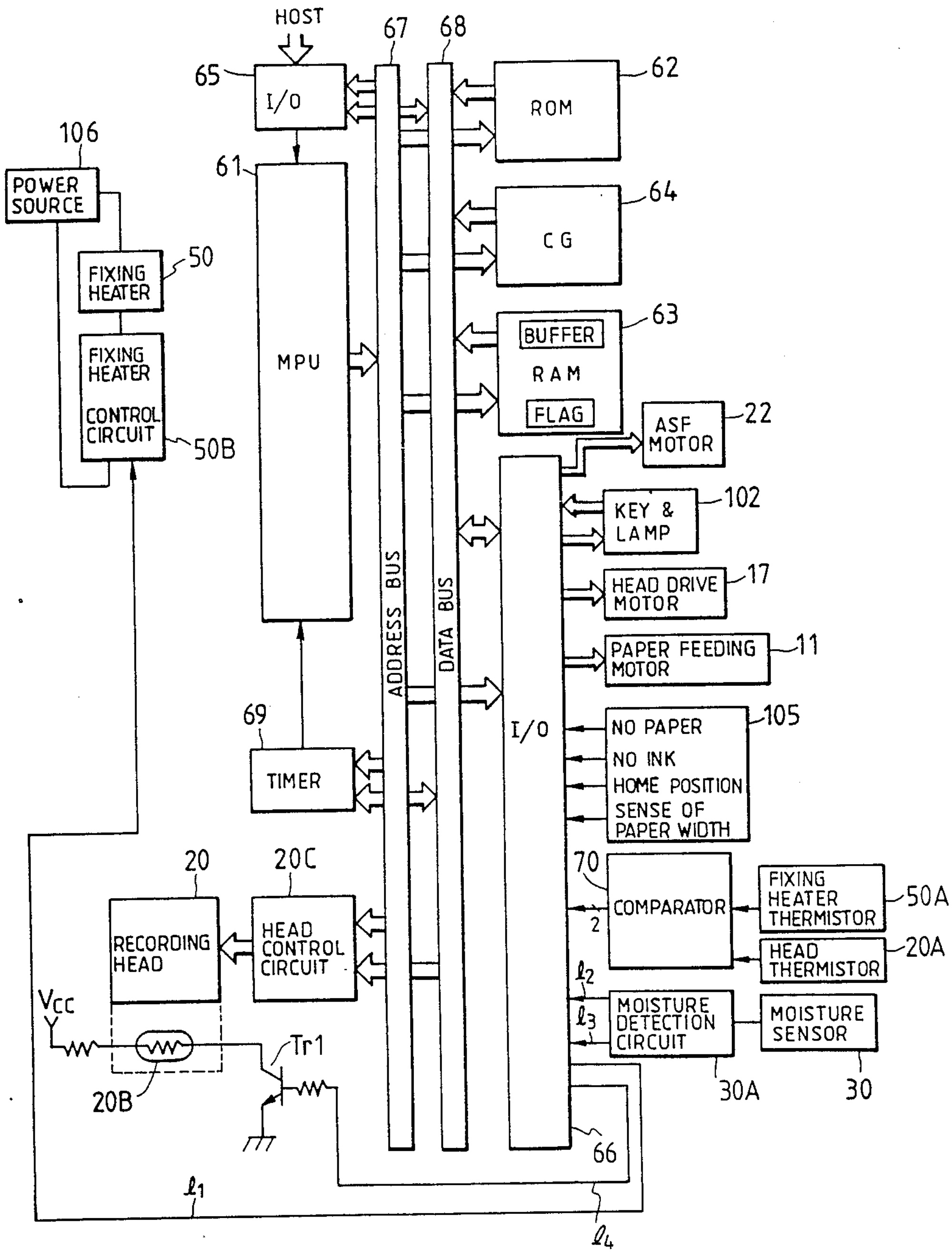
FIG. 7 is a block diagram of a control system for the ink jet printer of the present invention as shown in FIGS. 1–6.

FIG. 7 is a block diagram of a control system for use in the printer of each embodiment shown in FIGS. 1 to 6.

In FIG. 7 there are shown a microprocessing unit (MPU) 61 for controlling the entire printer; a read-only memory (ROM) 62 for storing control sequences of the printer, including those shown in FIGS. 11 to 14; a random access memory (RAM) 63 having a buffer area for temporarily storing the image information to be recorded, a work area for control, and a flag area to be explained later; a character generator (CG) 64 for storing characters corresponding to character data; a input/output interface (I/0) 65 for data exchange with a host computer; an input/output interface (I/O) 66 for data exchange with various sensors, motors and with the operation panel; a timer 69 for generating various timing signals such as those for the motors employed in the printer; and a head control circuit 20C for controlling the function of the recording head 20. The above-mentioned components 62-66, 69 and 20C are connected to the MPU 61 through an address bus 67, and are mutually connected by a data bus 68.

There are further provided sensors 105 for detecting, for example, absence of sheets, absence of ink, width of recording sheet, presence of the recording head 20 at the home position, etc.; a fixing heater thermistor 50A for detecting the temperature of the fixing heater 50; a head thermistor 20A for detecting the temperature of the recording head 20; and a comparator 70 for converting the temperature data from said thermistors 50A, 20A into binary signals utilizing predetermined temperatures as the threshold values.

Figure 8:
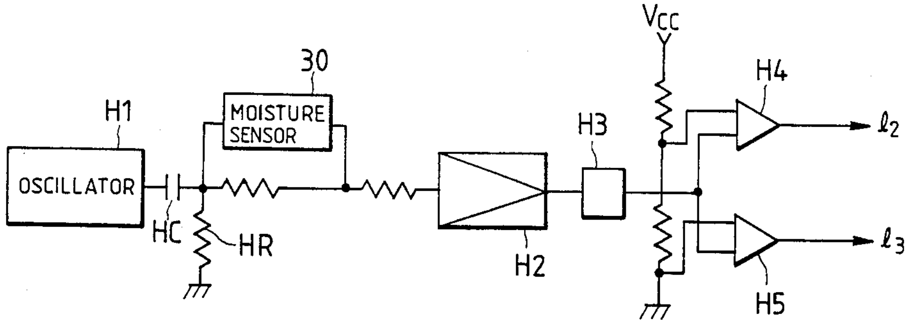
FIG. 8 is a circuit diagram showing an example of a humidity detecting circuit to be employed in the present invention.

A humidity detecting circuit 30A, to be explained later in relation to FIG. 8, is connected to the humidity sensor 30 for detecting the humidity of the recording zone, and has two signal lines $l_2$, $l_3$ connected to the I/O 66.

A transistor Tr1 is turned on by the logic level "1" of a signal line $l_4$ connected to the I/O 66 to supply a positive temperature property thermistor 20B of positive characteristic with a current, thereby elevating the temperature of the recording head 20.

Figure 9:
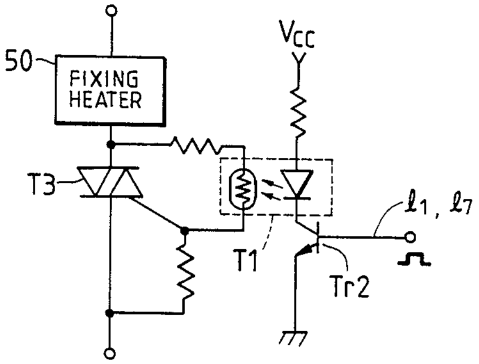
FIG. 9 is a circuit diagram showing an example of a fixing heater control circuit to be employed in the present invention.

A fixing heater control circuit 50B, to be explained in relation to FIG. 9, is controlled by the logic signal on a signal line $l_1$ connected with the I/O 66, whereby the temperature of the fixing heater 50 is controlled by the power from an AC power source 106.

I/O 66 is connected through signal lines other than the above-mentioned ones $l_1$-$l_4$, with the ASF motor 22, operation panel 102, head driving motor 17, sheet feed motor 11, sensors 105 and comparator 70.

FIG. 8 shows the details of the humidity detecting circuit shown in FIG. 7, wherein provided are an oscillator H1, a capacitor HC, a reference resistor HR, an amplifier H2, a rectifier H3, and comparators H4, H5. The aforementioned humidity sensor 30 varies the resistance according to the humidity.

An AC voltage generated by the oscillator HL and the capacitor HC is applied to a serial circuit of the reference resistor HR and the humidity sensor 30, and the voltage divided by the reference resistor HR is amplified and converted into a DC voltage by the amplifier H2 and the rectifier H3. Said DC voltage is compared with predetermined voltages in the comparator H4 or H5, and varies the logic signals in the signal lines $l_2$, $l_3$. More specifically, the resistances connected to the circuit are suitably selected in such a manner that the signal in the line $l_2$ assumes a level "1" or "0" respectively when the humidity detected by the humidity sensor 30 is above or below a predetermined value, for example 80%, and that the signal in the line $l_3$ assumes a level "1" or "0" respectively when the detected humidity is above or below, for example, 50%.

Thus a logic level "1" on the line $l_2$ indicates a high humidity, and a logic level "0" on the line $l_3$ indicates a low humidity.

FIG. 9 shows the details of the fixing heater control circuit shown in FIG. 7, wherein provided are a transistor Tr2, a photocoupler T1, a bidirectional three-terminal thyristor T3, and a fixing heater 50 mentioned above. When the signal line $l_1$ assumes a logic level "1" under the control of the MPU 61 through the I/O 66, the transistor Tr2 is turned on to emit light from the light-emitting element of the photocoupler T1, whereby the photosensor thereof generates a current which is supplied to the gate electrode of the bidirectional three-terminal thyristor T3.

Figure 10:
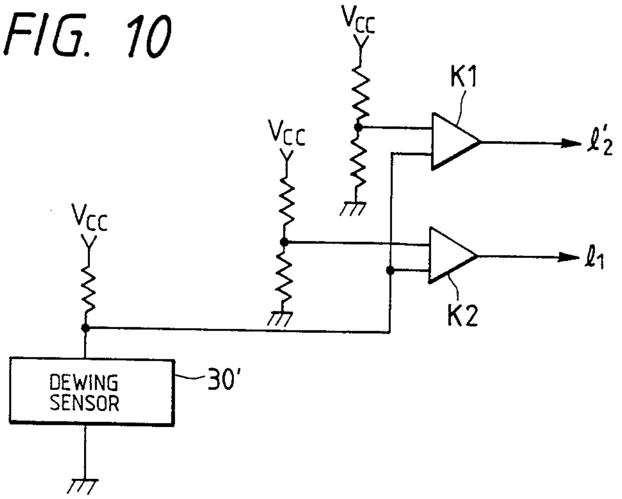
FIG. 10 is a circuit diagram showing an example of a dew detecting circuit to be employed in the present invention.

During the presence of an input to the gate electrode, regardless of the polarity of said input, said thyristor T3 transmits the AC current to the fixing heater 50 thereby elevating the temperature thereof. FIG. 10 is a circuit diagram of a dew detecting circuit constituting one of the humidity detecting means, wherein shown are a dew sensor 30', and comparators K1, K2. A voltage obtained by dividing a reference voltage Vcc with the resistance of the dew sensor 30' is supplied to terminals of the comparators K1, K2. The dew sensor 30' is a kind of humidity sensor, and rapidly increases the resistance thereof when the relative humidity approaches 100%. For example it shows a switching-like change in resistance at a relative humidity of 94%. Divided voltages of the reference voltage, supplied to the other terminals of the comparators K1, K2 are suitably selected with resistances in such a manner that the comparator K1 releases a logic signal "1" to the signal line $l_2'$, when the relative humidity is close to 100%, namely when the dewing is going to occur.

In this manner the dew sensor may be employed instead of the humidity sensor 30 explained before.

Figure 11:
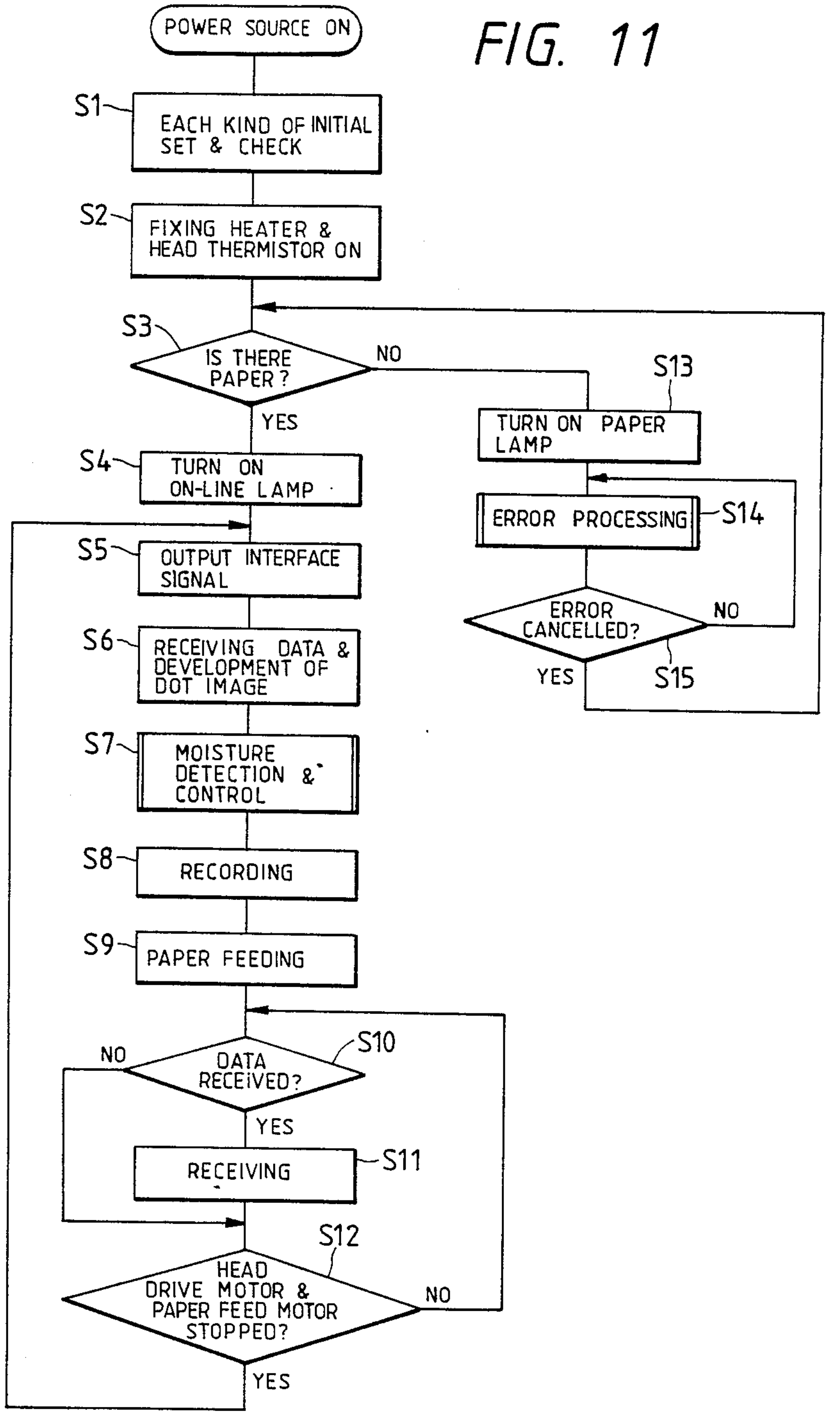
FIG. 11 is a flow chart showing an example of recording and the ancillary processes of the ink jet printer of the present invention.

FIG. 11 is a flow chart showing the sequence of functions or processing of the various parts of the above-explained printer.

When the power supply to the printer is turned on, a step S1 executes initializing and checking of the printer 100, including the clearing of the flags and counters in the RAM 63, and the checking of I/O ports. Then a step S2 turns on the head thermistor 20B and the fixing heater control circuit thereby heating the fixing heater 50 and the recording head 20.

A step S3 discriminates whether a recording medium 33 is present in the recording range. If not, the sequence proceeds to a step S13 to turn on a paper lamp on the operation, panel 102, thereby giving a warning of the absence of a recording sheet. Then a step S14 executes an error process such as the feeding of recording media 33 or transportation of the recording medium 33 to the recording zone, and a step S15 discriminates whether the error of absence of recording sheet has been resolved. If resolved, the sequence returns to the step S3.

If the discrimination in step S3 turns out affirmative, a step S4 makes an on-line state with the host computer, and turns on an on-line lamp on the operation panel 102. Then a step S5 releases a signal to shift the Busy signal to a logic level "0" thereby enabling data reception from the host computer. A next step S6 receives the image data to be recorded and develops a dot image of each scanning line in RAM 63.

A step S7 executes a process of humidity detection and control of the present invention, which will be explained later in relation to FIG. 12. A step S8 activates the heat drive motor 17 and the energy generating means of the recording head 20, thereby effecting start of the carriage 16 from the home position, recording in a predetermined range, returning of the carriage 16 to the home position, and stopping at a predetermined position During the returning and stopping operations of the carriage 16, a step S9 advances the recording medium 33.

Also during said operations, steps S10 and S11 may receive the image data from the host computer. A step S12 then discriminates whether the head drive motor 17 and the sheet feed motor 11 have been stopped. Recording of a line is completed through the above-explained sequence.

The above-explained steps execute the recording of a scanning line and the related processes, and the sequence returns to step S5 when the discrimination in step S12 turns out affirmative.

Figure 12:
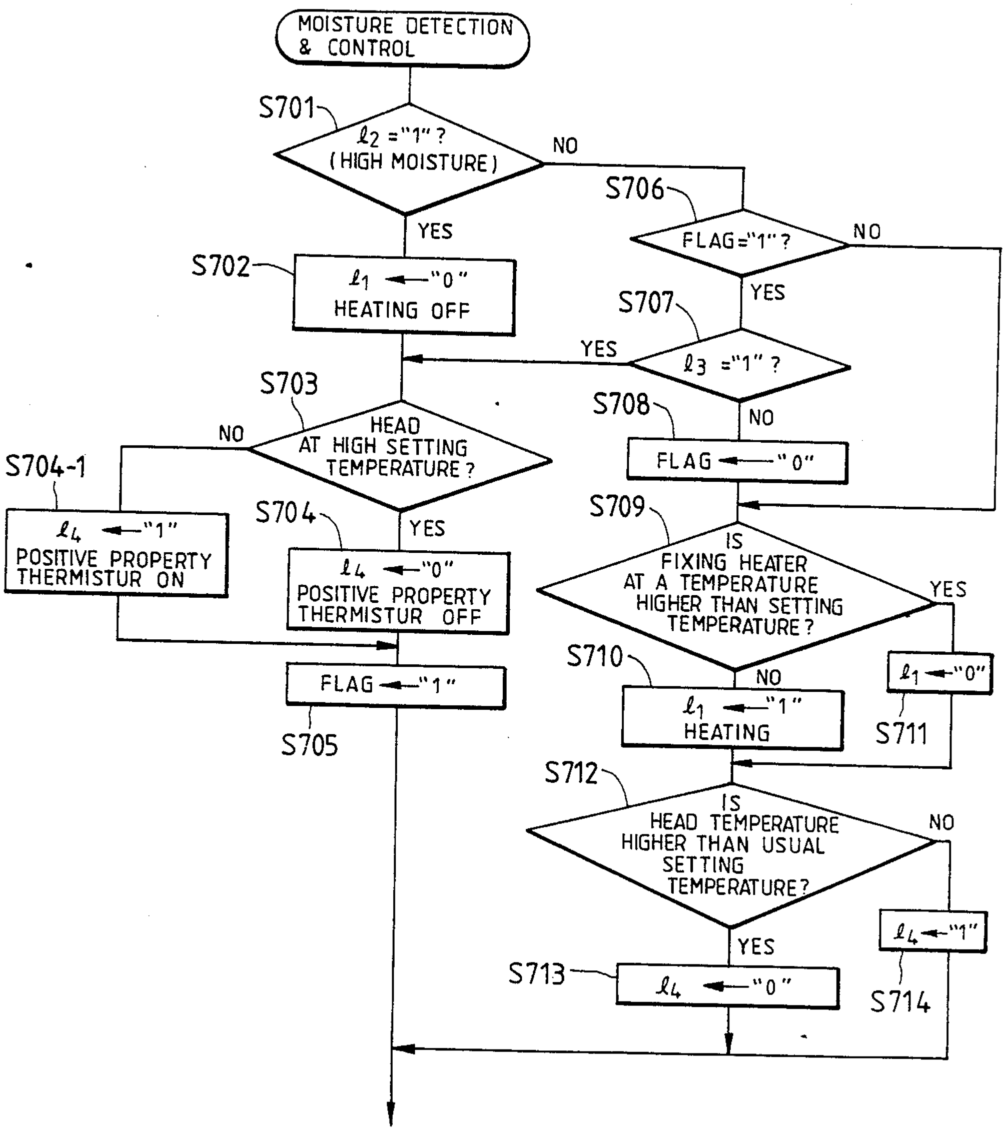
FIG. 12 is a flow chart of an another example of the humidity detection and control process of the present invention.

FIG. 12 is a flow chart showing the details of humidity detection and control, shown in the step S7 in FIG. 11.

A step S701 discriminates whether the recording zone is in a high humidity state, for example exceeding 80%, by checking the logic level of the signal line $l_2$, and, if it is "1" indicating the high humidity state, the sequence proceeds to a step S702 to shift the logic level of the signal line $l_1$ to "0" thereby terminating the heating of the fixing heater 50.

Then a step S703 discriminates whether the recording head 20 has been adjusted to a high temperature for the high humidity state, and, if not, a step S704-1 shifts the signal line $l_4$ to a logic level "1", thereby turning on the thermistor 20B of positive characteristics and heating the recording head 20. The dewing of the head 20 is thus prevented by terminating the heating of the heater 50 thereby reducing the water evaporation from the recording medium and lowering the humidity, and by elevating the temperature of the recording head 20 thereby reducing the temperature difference.

The recording head 20 has an upper limit temperature for the ink emission. Thus, when the predetermined high temperature is reached, the sequence proceeds to a step S704 to shift the signal line $l_4$ to a logic level "0", thereby turning off the thermistor 20B and terminating the heating of the head 20. Then the sequence proceeds to a step S705 to set a flag to "1", indicating that a high humidity state has existed at least immediately before in the recording zone. The routine of humidity detection and control is thus terminated.

If the discrimination in step S701 turns out negative, indicating that the recording zone is not in the high humidity state, a step S706 discriminates if the flag is in a state "1". If it is "1", indicating the presence of a high humidity state immediately before, a step S707 discriminates whether the humidity has been lowered, by checking the state of the signal line $l_3$. If it is "1", indicating that a predetermined humidity, for example less than 50%, has not been reached, the sequence proceeds to the step S703 to effect the above-explained process for lowering the humidity under the temperature control of the head, and the routine of humidity detection and control is thus terminated.

On the other hand, if the discrimination in the step S707 turns out negative, indicating a low humidity state in the recording zone, the sequence proceeds to a step S708 for resetting the flag to "0" and to a step S709 for entering the normal operation. Also if the discrimination in the step S706 turns out negative, indicating the absence of the high humidity state immediately before, the sequence proceeds to the step S709.

Then steps S709 and S710 or S709 and S711 execute ordinary heater temperature setting. More specifically, the step S709 discriminates whether the heater temperature is higher or lower than a predetermined temperature, for example 75° C., and, if lower, the step S710 shifts the signal line $l_1$ to a logic level "1" to activate the fixing heater 50, or, if higher, the step S711 shifts the signal line $l_1$ to "0" thereby deactivating the fixing heater 50.

Then steps S712 and S713 or S714 execute ordinary temperature control of the recording head. The step S712 discriminates whether the temperature of the head 20 is higher or lower than a predetermined temperature, for example 30° C., and, if higher, the step S713 shifts the signal line $l_4$ to "0" to terminate the heating of the head 20, or, if lower, the step S714 shifts the signal line $l_4$ to "1" to turn on the thermistor 20B thereby heating the head 20. In this manner the routine of humidity detection and control is terminated.

Figure 13:
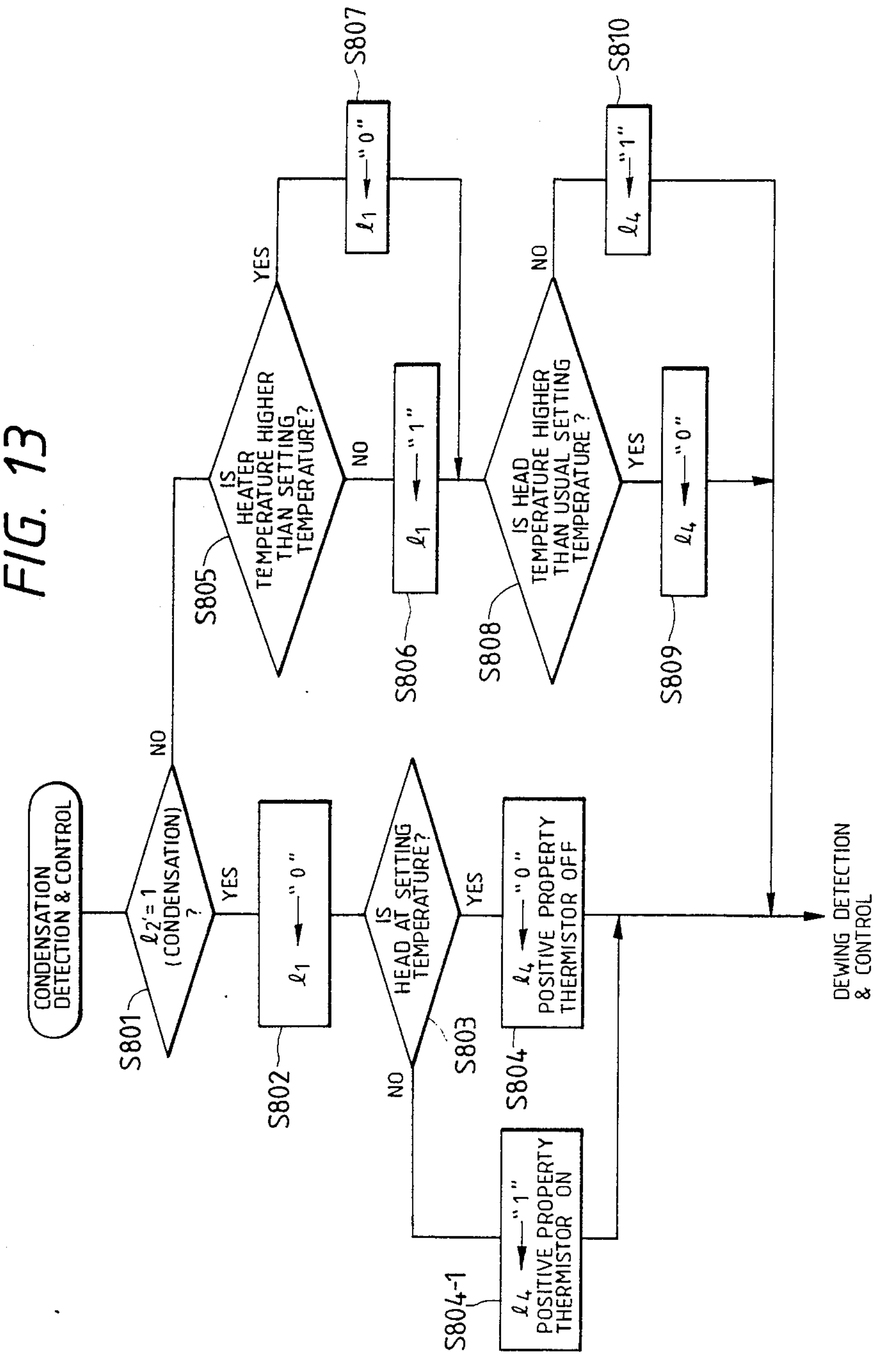
FIG. 13 is a flow chart of an another example of the dew detection and control process of the present invention.

FIG. 13 is a flow chart for the dew detection and control in the step S7 in FIG. 11, in case the dew sensor shown in FIG. 10 is employed.

In this case the signal line $l_2$ for sending the high humidity signal is replaced by a signal line $l_2'$ for sending a signal representing a dew state.

A step S801 discriminates whether the head 20 is in a dewing state by checking the state of said signal line $l_2'$, and, if it is in a logic level "1" indicating that the head 20 is already in a dewing state or close to such state, a step S802 shifts the signal line $l_1$ to a logic state "0" to deactivate the fixing heater 50. Then a step S803 discriminates whether the recording head 20 has been regulated to a predetermined high temperature in the dew state, and, if not, a step S804-1 shifts the signal line $l_4$ to a logic level "1" thereby heating the recording head 20. Thus the dewing of the head 20 is reduced by lowering the temperature of the heater 50 thereby reducing the moisture evaporation from the recording medium and reducing the humidity, and by elevating the temperature of the head 20.

The recording head 20 has an upper limit temperature for ink emission. Therefore, when the high predetermined temperature is reached, the signal line $l_4$ is shifted to a logic level "0", at a step S804, to turn off the thermistor 20B, thereby terminating the heating of the head 20.

If the discrimination in the step S801 turns out negative, indicating the absence of dewing, a sequence starting from a step S805 executes ordinary temperature setting of the heater 50 and the recording head 20.

More specifically, steps S805 and S806 or S807 execute ordinary heater temperature setting. The step S805 discriminates whether the heater 50 is higher or lower than a predetermined temperature, and, if lower, the step S806 shifts the signal line $l_1$ to a logic level "1" to activate the fixing heater 50, or, if higher, the step S807 shifts said signal line $l_1$ to "0" thereby deactivating the fixing heater 50.

Then steps S808 and S809 or S810 execute ordinary temperature control for the recording head 20. The step S808 discriminates whether the temperature of the head 20 is higher or lower than a predetermined temperature, and, if higher, the step S809 shifts the signal line $l_4$ to a logic level "0" thereby terminating the heating of the head 20, or, if lower, the step S810 shifts the signal line $l_4$ to a logic level "1" to turn on the thermistor 20B, thereby heating the head 20. In this manner the routine of dew detection and control is terminated.

Figure 14:
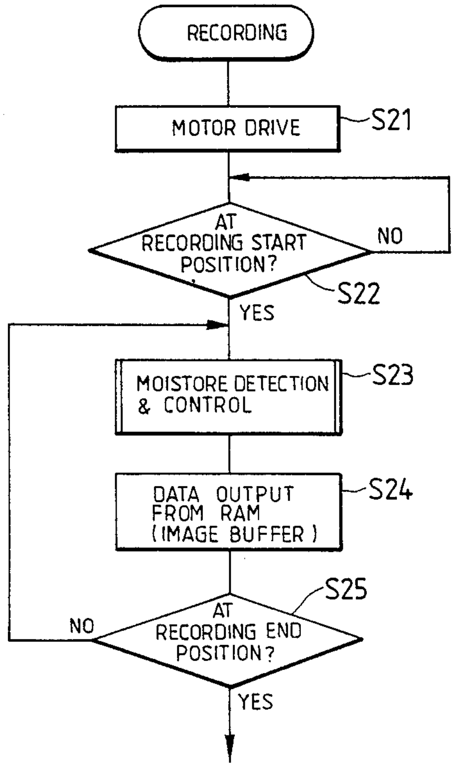
FIG. 14 is a flow chart in case the process shown in FIG. 11 is conducted during a recording operation.

FIG. 14 is a flow chart in which the routine of humidity detection and control is included, as a step S23, in the recording of a scanning line shown by the setp S8 in FIG. 11.

A step S21 activates the head driving motor 17, and a step S22 awaits the movement of the recording head 20 to the recording position. When the head 20 reaches the recording start position, a step S23 executes the above-mentioned routine of humidity detection and control, and a step S24 simultaneously executes recording by releasing the dot image from the buffer area of the RAM 63. The sequence is terminated upon detection, in a step S25, of the movement of the head 20 to a recording end position.

Figure 15:
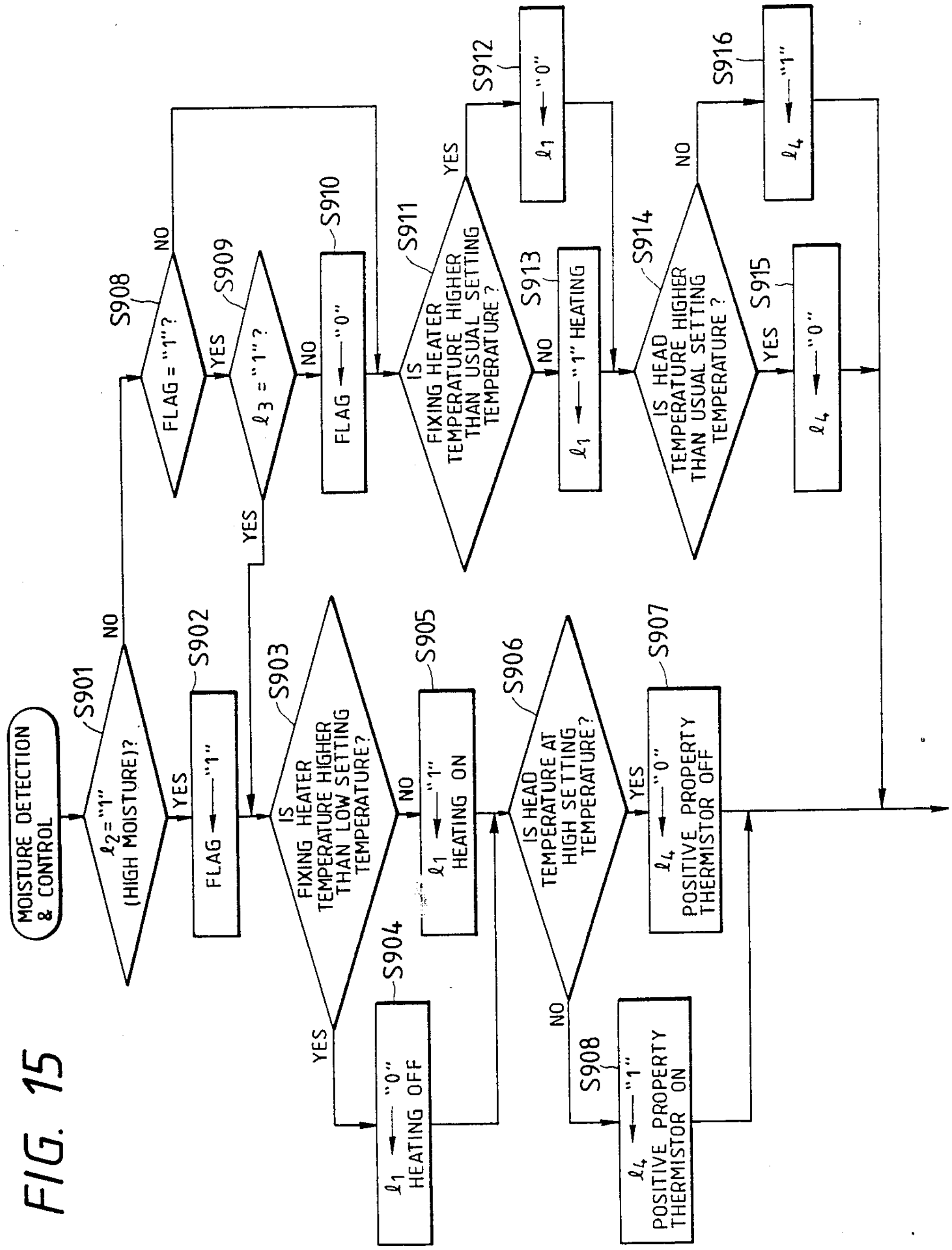
FIG. 15 is a flow chart showing the humidity detection and control of the ink jet printer.

FIG. 15 is a flow chart showing humidity detection and control different from the process shown in FIG. 12.

It is different from the case shown in FIG. 12, in steps S903 to S905. When the recording zone is at a high humidity state, the process shown in FIG. 12 merely terminates the heating with the fixing heater 50 in the step S702. In the case as shown in FIG. 15, at first a step S903 discriminates whether the temperature of the fixing heater 50 is higher or lower than a predetermined low temperature, and, if higher, a step S904 deactivates the heater 50, or, if lower, a step S905 activates the heater 50.

In this manner it is rendered possible to maintain a dew-free state while maintaining the fixing function by controlling the fixing heater 50 at a temperature lower than the usual temperature, for example 75° C., so that more sophisticated antidewing can be achieved.

The process of the steps S903 to S905 can naturally be executed in the process shown in FIG. 13.

Also the low temperature state of the heater 50 may be controlled in plural levels according to the result of detection by the sensor.

[Fourth embodiment]

Figure 16:
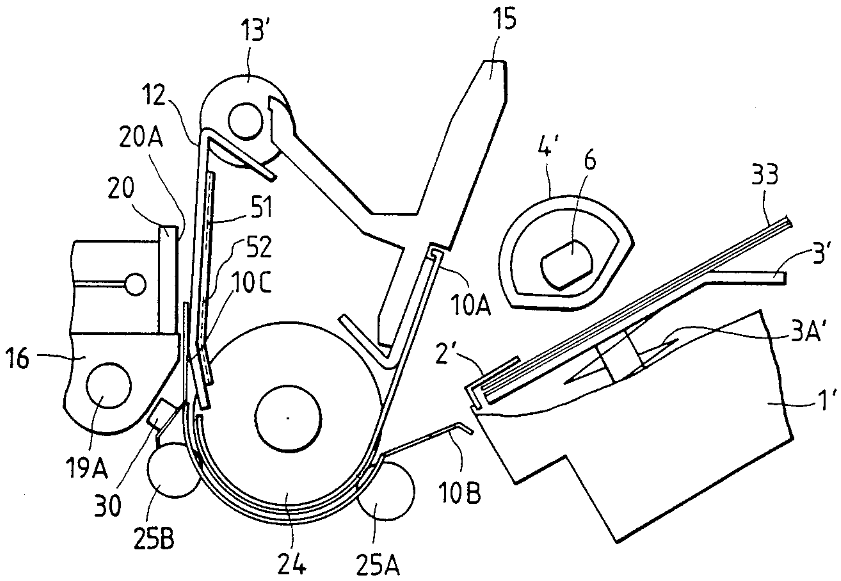
FIG. 16 is a schematic cross-sectional view of the ink jet recording apparatus constituting another embodiment of the present invention.

In the following there will be explained a fourth embodiment of the present invention, which is the same, in the basic structure, as the first to third embodiments, except for the use of plural fixing heaters and a circuit for suitably driving said plural fixing heaters as shown in FIG. 16, in which the same components as those in FIG. 3 will be omitted from the following explanation.

In FIG. 16, fixing heaters 51, 52 are mounted on a face of the platen 12, made of metal, rubber or plastics, opposite to the face contacting the recording sheet 33. Said fixing heaters 51, 52 heat the platen 12, of which heat is transmitted to the recording medium 31 for drying said medium itself or the ink thereon. The heater 52 is designed to heat the recording medium 33 prior to recording, and the heater 51 is designed to heat it after recording.

The position of the humidity sensor is not limited also in the present fourth embodiment so far as the object of the present invention is achieved, but it is preferably positioned in the vicinity of the recording zone as in the first to third embodiments.

Figure 17:
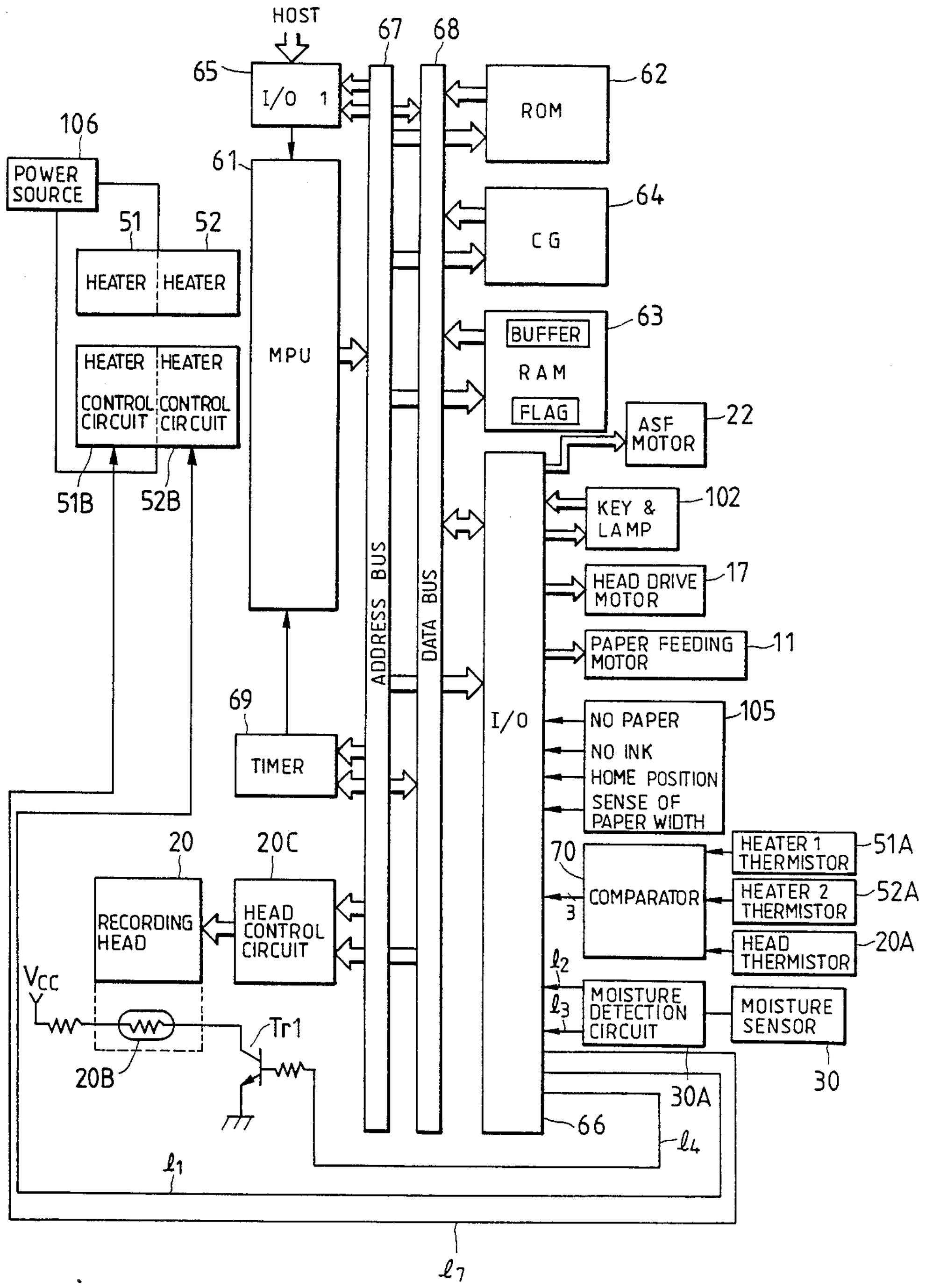
FIG. 17 is a block diagram of the control system of the ink jet printer as shown in FIG. 16.

FIG. 17 is a block diagram of the control system in the fourth embodiment, which is in basic structure similar to that shown in FIG. 7.

In FIG. 17 there are shown fixing heater thermistors 51A, 52A for detecting the temperatures of fixing heaters 51, 52; a head thermistor 20B for detecting the temperature of the recording head 20; and a comparator 70 for converting the temperature data from said thermistors 51A, 52A into binary signals, utilizing predetermined temperatures as threshold values.

Figure 18:
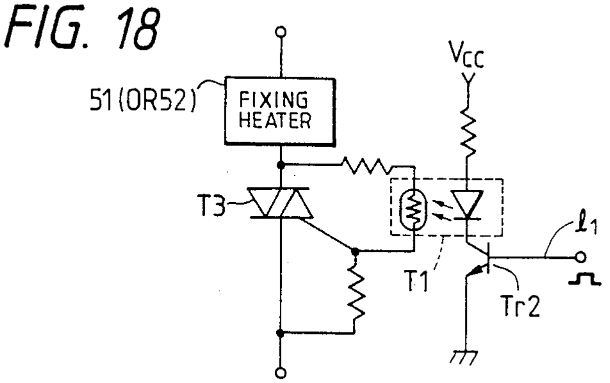
FIG. 18 is a circuit diagram showing an example of the fixing heater control circuit to be employed in the ink jet printer as shown in FIG. 16.

Fixing heater control circuits 51B, 52B to be explained later in relation to FIG. 18 are controlled by the logic signal of a signal line $l_7$ connected to the I/O 66, whereby the temperatures of the fixing heaters 51, 52 are controlled under the power supply from the AC power source 106.

The I/O 66 is connected, through signal lines other than $l_1$–$l_4$ and $l_7$, to the ASF motor 22, operation panel 102, head drive motor 17, sheet feed motor 11, sensors 105 and comparator 70.

FIG. 18 shows the details of the fixing heater control circuit shown in FIG. 17, which is basically similar to that shown in FIG. 9. There are provided a transistor Tr2, a photocoupler T1 a bidirectional three-terminal thyristor T3, and fixing heater 51 (52) explained above. When the signal line $l_1$ ($l_7$) is brought to a logic level "1" under the control of the MPU 61 through the I/O 66, the transistor Tr2 is turned on to emit light from the light-emitting element of the photocoupler T1, whereby the photosensor of the photocoupler T1 sends a current to the gate electrode of the bidirectional three-terminal thyristor T3.

During the presence of the input to the gate electrode, and regardless of the polarity of said input, the thyristor T3 transmits the AC power to the fixing heater 51 (52) to raise the temperature thereof.

In the present fourth embodiment, the humidity detecting circuit or the dew detecting circuit can be similar to that shown in FIG. 8 or 10, and will not, therefore, be explained further.

Also the basic control sequence for the components of the printer is the same as that shown in FIG. 11, except that step S2 drives plural fixing heaters. More specifically step S2 turns on the thermistor 20B for the head 20 and the fixing heater control circuits 51B, 52B, thereby heating the fixing heaters 51, 52 and the recording head 20.

Figure 19:
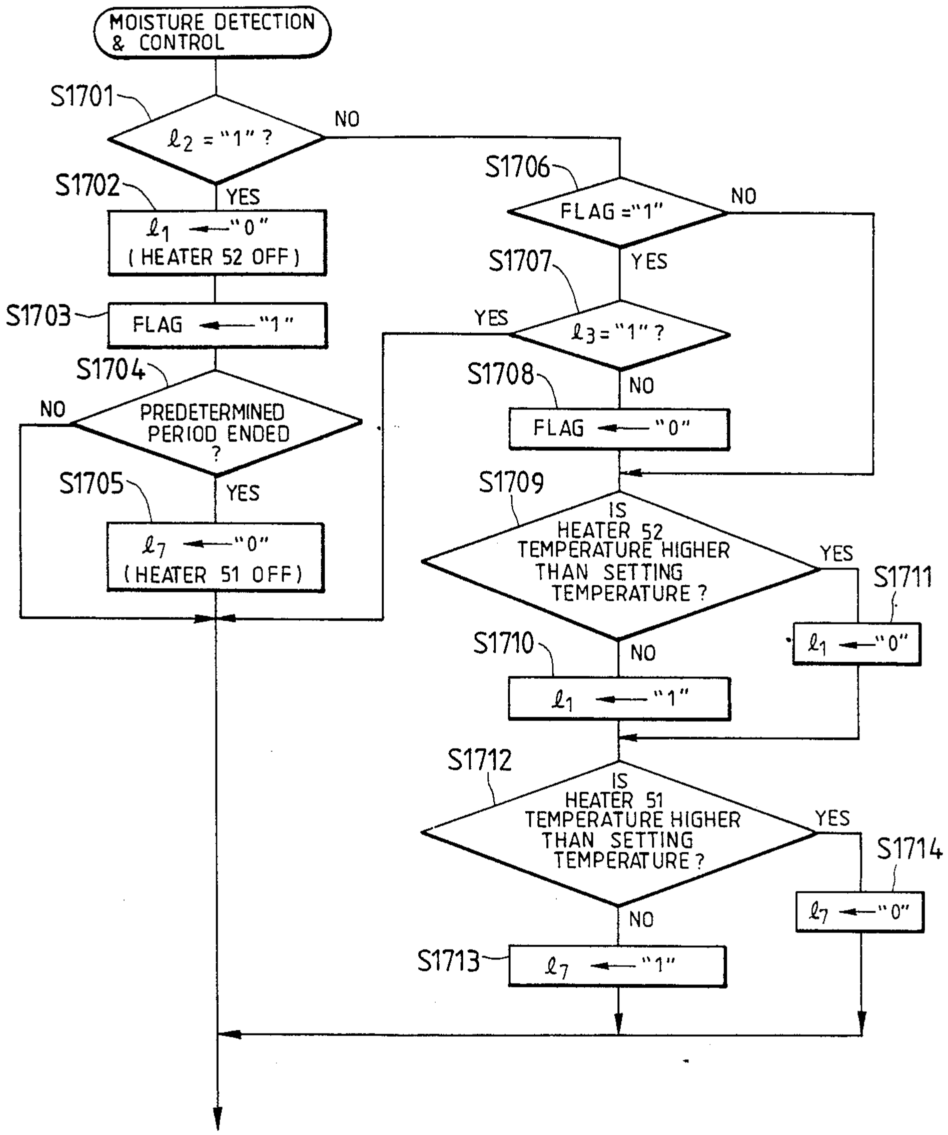
FIG. 19 is a flow chart showing an example of the humidity detection and control process in the ink jet printer as shown in FIG. 16.

FIG. 19 is a flow chart showing the details of the routine of humidity detection and control in the fourth embodiment, corresponding to step S7 in FIG. 11.

A step S1701 discriminates whether the recording zone is in a high humidity state, by checking the logic level of the signal line $l_2$, and, if it is "1" indicating the high humidity state, for example higher than 80%, the sequence proceeds to a step S1702 to shift the logic level of the signal line $l_1$ to "0" thereby terminating the heating of the fixing heater 52. In this manner the moisture evaporation from the recording medium prior to recording is reduced, and the humidity in the recording zone is lowered.

Then a step S1703 sets the flag to "1", indicating that a high humidity state has existed at least immediately before in the recording zone. Then a step S1704 discriminates the lapse of a predetermined period. If the high humidity state continues for the predetermined period, a next step S1705 shifts the signal line $l_7$ to a logic level "0" thereby deactivating the heater 51. Thus the moisture evaporation from the recording medium is further lowered by the deactivation of the heater 51, in addition to the heater 52.

The routine of humidity detection and control is terminated after the process of step S1705, or if the discrimination of step S1704 turns out negative.

If the discrimination of step S1701 turns out negative, indicating the absence of the high humidity state in the recording zone, the sequence proceeds to a step S1706 for discriminating the state of the flag. If it is "1", indicating the presence of a high humidity state immediately before, a step S1707 checks the logic level of the signal line $l_3$, thereby discriminating whether a low humidity state has been reached. If it is "1", indicating that a predetermined humidity, for example 50%, has not yet been reached, the routine of humidity detection and control is terminated in order to await the lowering of the humidity.

If the discrimination of the step S1707 turns out negative, indicating a low humidity state in the recording zone, a step S1708 resets the flag to "0", and the sequence proceeds to a step S1709. Also if the discrimination in step S1706 is negative, indicating the absence of the high humidity state immediately before, the sequence proceeds likewise to the step S1707.

Then steps S1709 and S1710 or S1711 execute ordinary temperature setting for the heater 52. The step S1709 discriminates whether the temperature of the heater 52 is higher or lower than a predetermined ordinary temperature, and, if higher, the step S1711 shifts the signal line $l_1$ to a logic level "0", thereby deactivating the heater 52, or, if lower, the step S1710 shifts said signal line $l_1$ to a logic level "1" thereby activating the heater 52.

Then steps S1712 and S1713 or S1714 execute ordinary temperature setting for the heater 51 in a similar manner as in the heater 52, and the routine of humidity detection and control is terminated.

Figure 20:
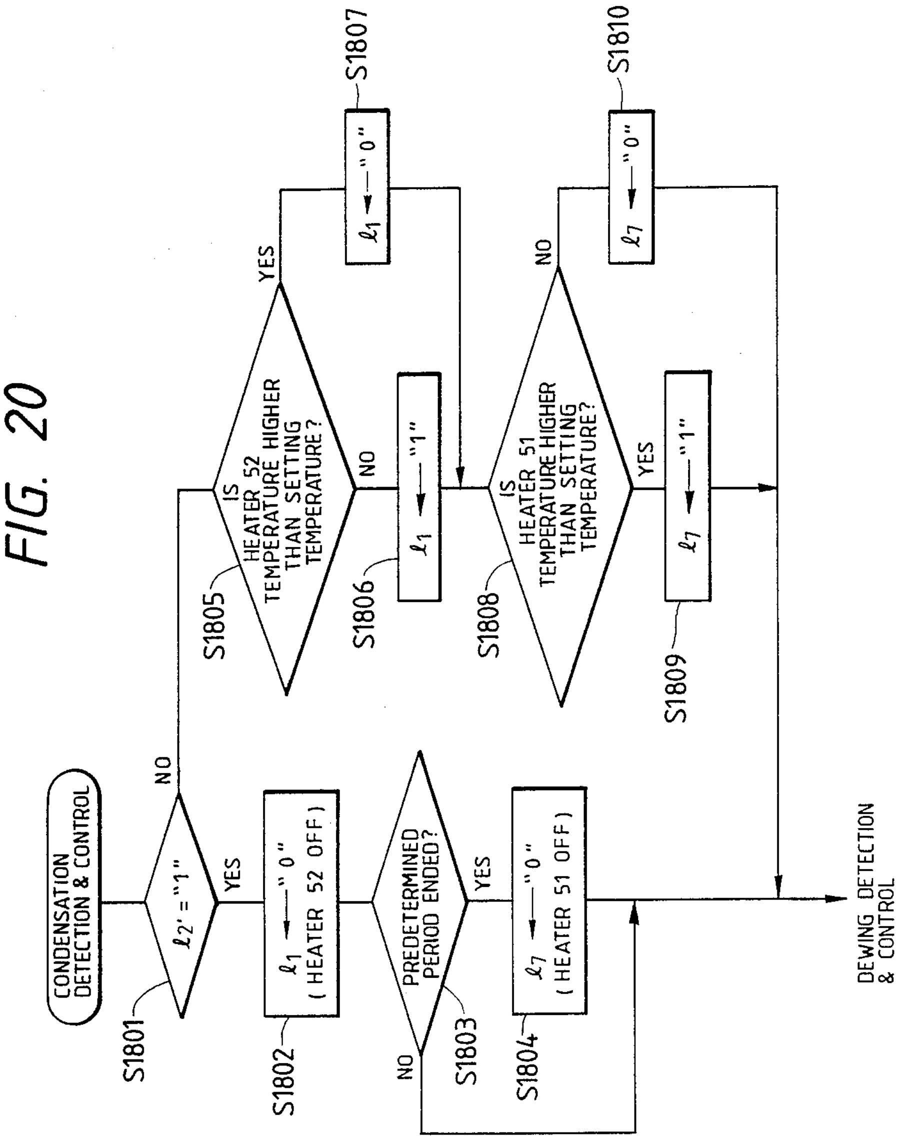
FIG. 20 is a flow chart showing an example of the dew detection and control process in the apparatus as shown in FIG. 16.

FIG. 20 is a flow chart for the dew detection and control in the step S7 in FIG. 11, in case the humidity sensor in the fourth embodiment is replaced by a dew sensor as shown in FIG. 10.

In this case the signal line $l_2$ for sending the high humidity signal is replaced by a signal line $l_2'$ for sending a signal representing a dewing state.

A step S1801 discriminates whether the head 20 is in a dewing state by checking the state of said signal line $l_2'$, and, if it is in a logic level "1" indicating that the head 20 is already in a dewing state or close to such state, a step S1802 shifts the signal line $l_1$, as the step S702 shown in FIG. 19, to a logic state "0" to deactivate the heater 52. Then steps S1803 and S1804 execute a process similar to the steps S1704 and S1705 shown in FIG. 19.

If the discrimination in step S1801 turns out negative, indicating the absence of dewing, the sequence proceeds to steps S1805 to S1810 for executing a process similar to that in steps S1709–S1714 shown in FIG. 19, for ordinary temperature setting for the heaters 52 and 51.

The ordinary temperature setting of the heater 52 causes moisture evaporation from the recording medium prior to recording, thereby improving the image fixation thereon and reducing the amount of moisture evaporation in the recording zone, thus lowering the humidity therein.

Also in the present embodiment, it is possible to include the above-explained routine of humidity detection and control in the recording operation of a scanning line, represented by the step S8 in FIG. 11. The process sequence in such case is similar to that shown in FIG. 14.

Figure 21:
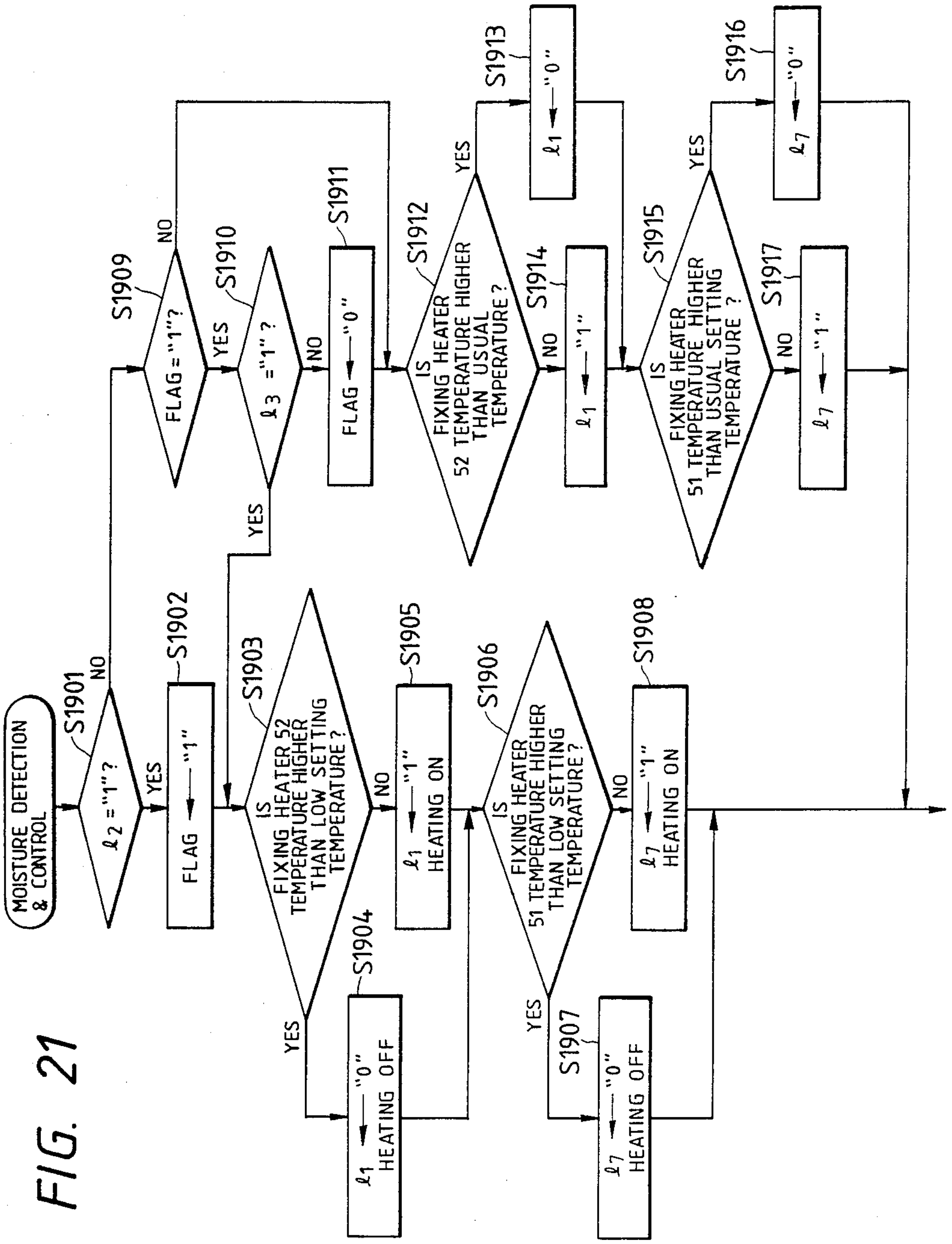
FIG. 21 is a flow chart showing another example of the humidity detection and control process of the apparatus as shown in FIG. 16.

FIG. 21 is a flow chart showing an example of humidity detection and control of a process different from the one shown in FIG. 19.

It is different from the process shown in FIG. 19, in steps S1903 to S1908. When the recording zone is at a high humidity state, for example higher than 80%, the process shown in FIG. 19 merely terminates the heating with the heaters 51, 52. In the present embodiment, at first a step S1903 discriminates whether the temperature of the heater 52 is higher or lower than the predetermined low temperature, and, if higher, a step S1904 deactivates the heater 52, or, if lower, a step S1905 activates the heater 52. Then steps S1906 to S1908 control the heater 51 in a similar manner.

In this manner it is rendered possible to maintain a dew-free state while maintaining the fixing function by controlling the fixing heaters 51, 52 at a temperature lower than the usual temperature, so that more sophisticated anti-dewing can be achieved.

The process of the steps S1903 to S1908 can naturally be executed in the process shown in FIG. 20.

Also the low temperature state of the heaters 51, 52 may be controlled in plural levels according to the result of detection by the sensor.

[Fifth embodiment]

In the following there will be explained a fifth embodiment of the present invention, which is the same, in the basic structure, as the first, second or third embodiment but is different in the use of a humidity sensor for detecting the humidity outside the apparatus, in addition to the humidity sensor in the foregoing embodiments.

In the following description, the structures the same as those in the foregoing embodiments will be explained by the drawings already cited or will be omitted from the description, and only the different points will be explained.

Figure 22:
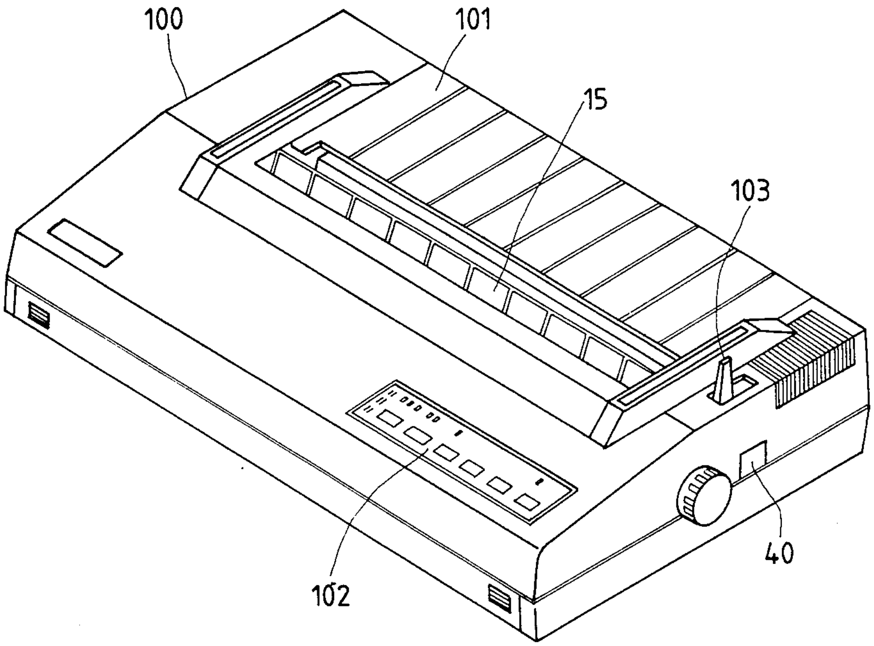
FIG. 22 is a schematic external perspective view of an ink jet recording apparatus relating to still another embodiment of the present invention.
Figure 23:
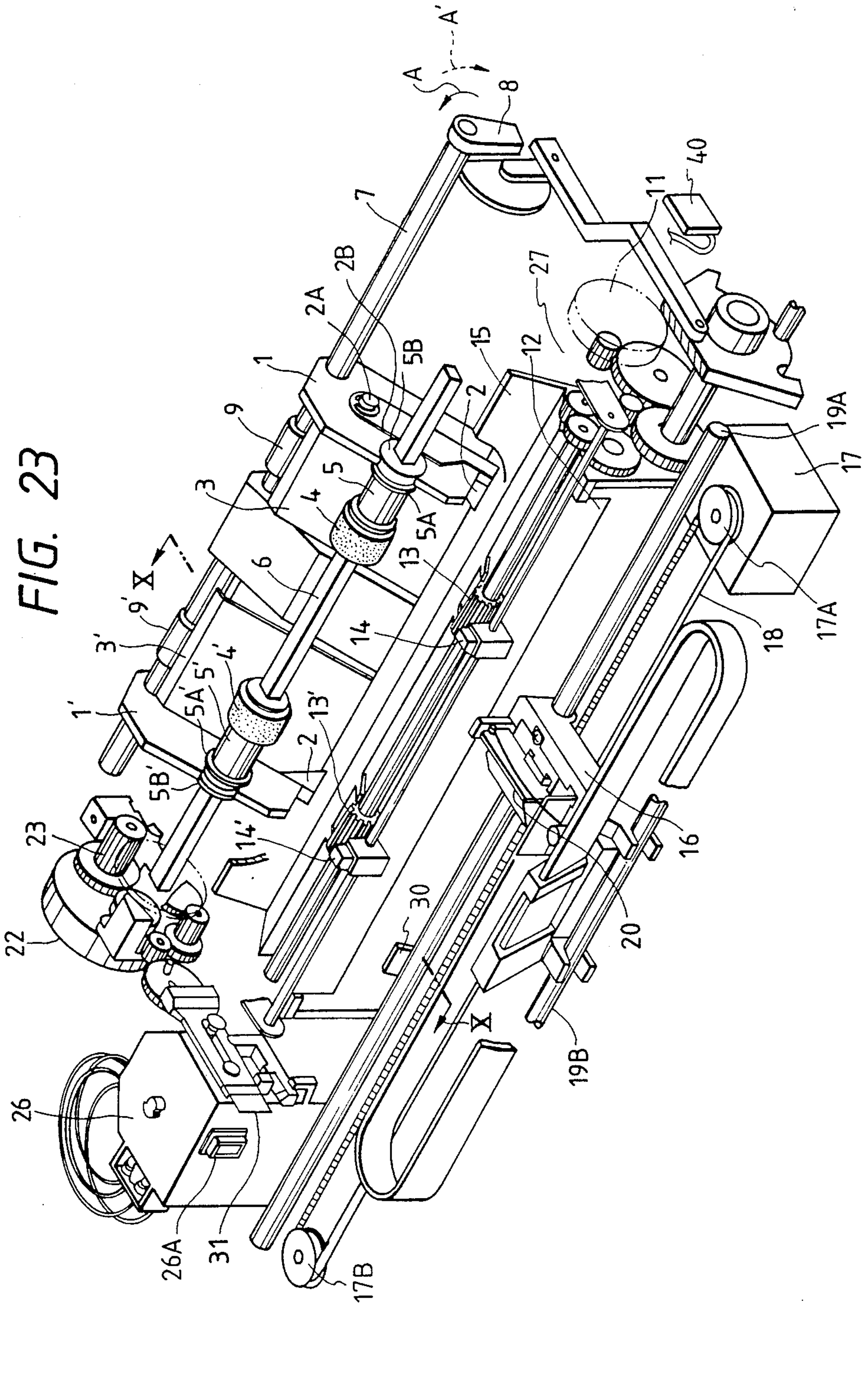
FIG. 23 is a schematic perspective view of the ink jet recording apparatus shown in FIG. 22, without the outer casing.

FIG. 22 shows the external view of the printer, and FIG. 23 shows the principal structure thereof.

In FIGS. 22 and 23, an external humidity sensor 40 is provided on a lateral face of the main body 100, the temperature control of the fixing device according to the present invention will be explained later.

The sensor 40 is not limited in its position, and may be provided on another position, for example in the front face or the rear face of the apparatus.

Figure 24:
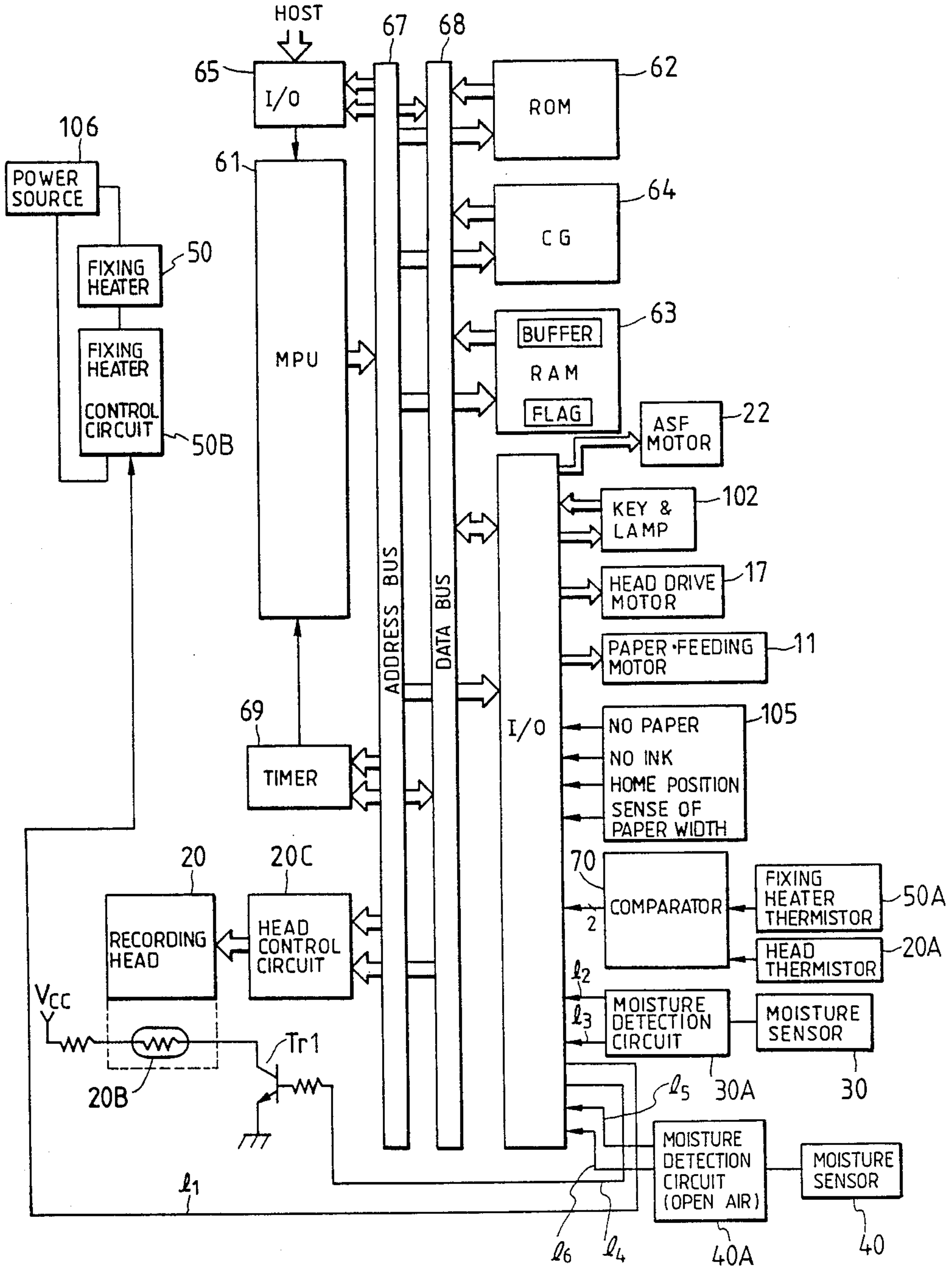
FIG. 24 is a block diagram showing an exmaple of the control system for use in the ink jet recording apparatus as shown in FIGS. 21 and 22.

FIG. 24 is a block diagram of the control system of the printer of the present embodiment, which is the same, in basic structure, as that shown in FIG. 7.

Figure 25:
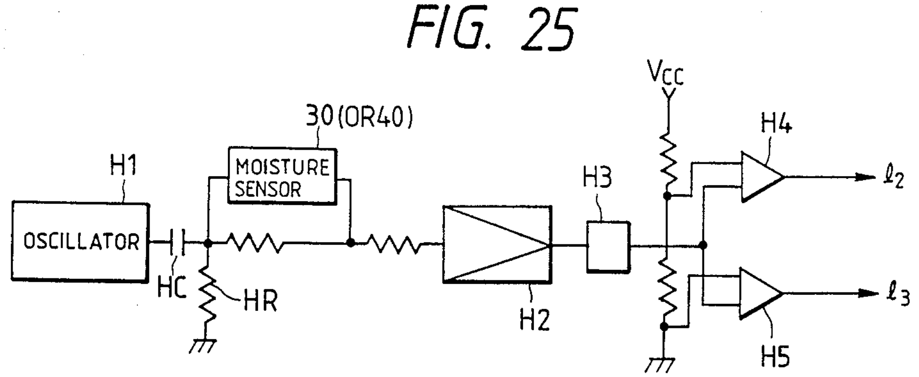
FIG. 25 is a circuit diagram showing an example of the humidity detecting circuit shown in FIG. 24.

Humidity detecting circuits 30A, 40A, to be explained later in relation to FIG. 25, are respectively connected to the humidity sensor 30 for detecting the humidity of the recording zone and a humidity sensor 40 for detecting the external humidity, and respectively have signal lines $l_2$, $l_3$ and $l_5$, $l_6$ connected to the I/O 66.

FIG. 25 shows the details of the humidity detecting circuit shown in FIG. 24, wherein provided are an oscillator H1; a capacitor HC; a reference resistor HR; an amplifier H2; a rectifier H3; comparators H4, H5; and above-mentioned humidity sensors 30, 40 varying the resistance according to the humidity.

An AC voltage generated by the oscillator H1 and the capacitor HC is supplied to a serial circuit composed of the reference resistor HR and the humidity sensor 30 (40), and the voltage divided by the reference resistor HR is amplified and converted into a DC voltage by the amplifier H2 and the rectifier H3. The obtained DC voltage is compared with a predetermined voltage with the comparator H4 or H5, and varies the logic signal of the signal line $l_2$ or $l_5$ or $l_3$ or $l_6$. The resistances connected to the circuits are suitably selected in such a manner that the signal lines $l_2$, $l_5$ assume a logic level "1" or "0" respectively when the humidity detected by the sensor 30 or 40 is above or below a predetermiend value, for example 80%, and that the signal lines $l_3$, $l_6$ assume a logic level "1" or "0" respectively when the detected humidity is above or below, for example, 50%.

Thus the logic level "1" of line $l_2$ or $l_5$ indicates a high humidity state, and the logic level "0" of line $l_3$ or $l_6$ indicates a low humidity state.

Also in the present embodiment, a circuit shown in FIG. 9 may be employed as the fixing heater control circuit. Also the control sequence for various components of the printer can be the same as that shown in FIG. 11.

Figure 26:
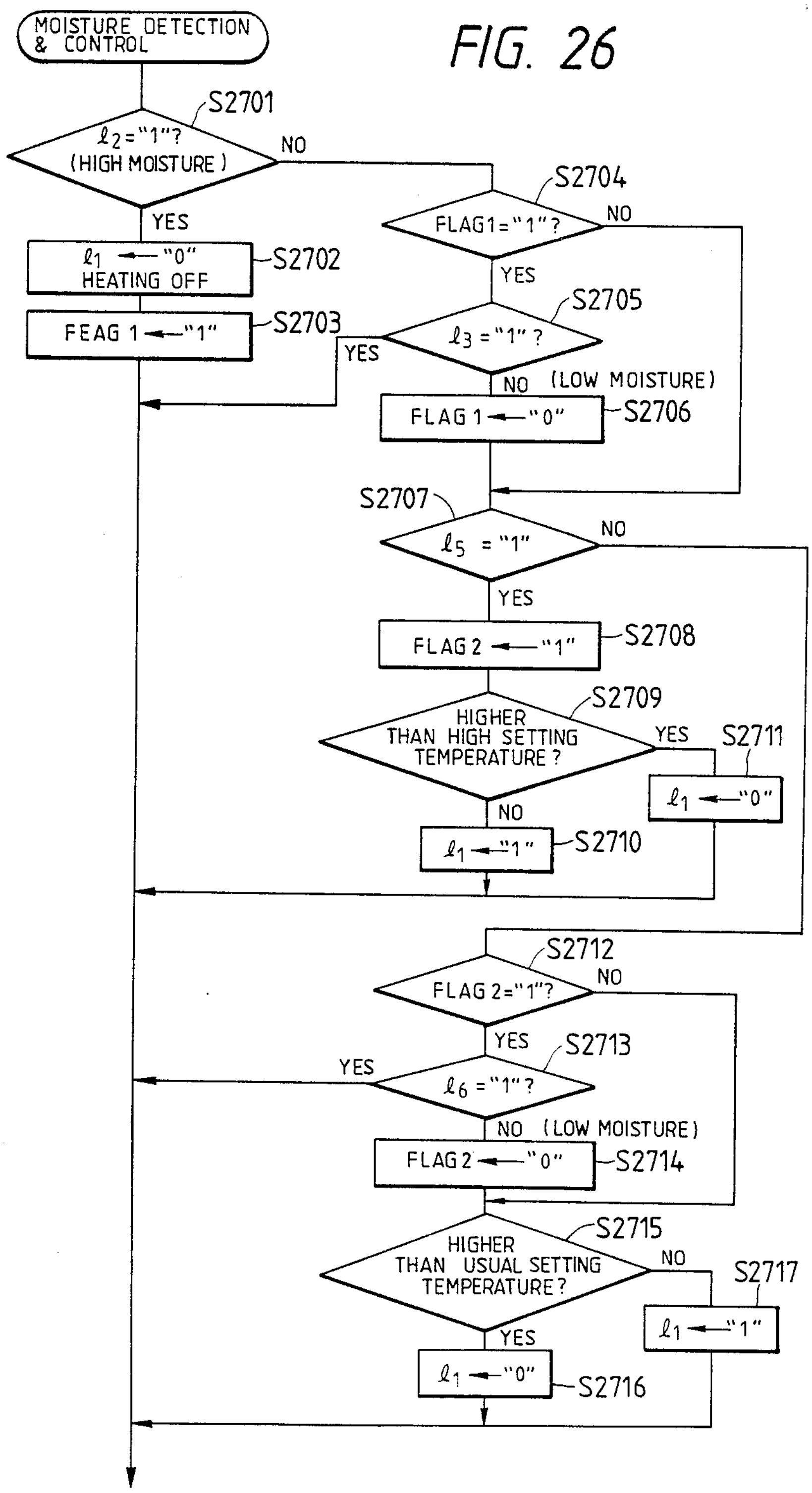
FIG. 26 is a flow chart showing an exmaple of the humidity detection and control process as shown in FIGS. 21 and 22.

FIG. 26 is a flow chart showing the details of the process of humidity detection and control shown in step S7 in FIG. 11.

A step S2701 discriminates whether the recording zone is in a high humidity state, by checking the logic level of the signal line $l_2$, and, if it is "1" indicating the high humidity state, for example higher than 80%, the sequence proceeds to a step S2702 to shift the logic level of the signal line $l_1$ to "0" thereby terminating the heating of the fixing heater 50 and reducing the moisture evaporation from the recording medium. Then a step S2703 sets a flag FLAG1 to "1", indicating that a high humidity state has existed at least immediately before in the recording zone. The routine of humidity detection and control is thus terminated.

If the discrimination in the step S2701 turns out negative, indicating that the recording zone is not in the high humidity state, a step S2704 discriminates if the flag FLAG1 is in a state "1". If it is "1", indicating the presence of a high humidity state immediately before, a step S2705 discriminates whether the humidity has been lowered, by checking the state of the signal line $l_3$. If it is "1", indicating that a predetermined humidity, for example 50% or less, has not been reached, the above-explained flow for reducing the humidity is continued, and the process of humidity detection and control is terminated.

On the other hand, if the discrimination in the step S2705 turns out negative, indicating a low humidity state in the recording zone, the sequence proceeds to a step S2706 for resetting the flag FLAG1 to "0" and then to a step S2707. If the discrimination in the step S2704 turns out negative, indicating the absence of high humidity state immediately before in the recording zone, the sequence likewise proceeds to step S2707.

The step S2707 discriminates whether the external atmosphere of the printer 100 is in a high humidity state, for example 80%, by checking the logic level of signal line $l_2$. If it is "1", indicating the high humidity state of the external atmosphere, a step S2708 sets a flag FLAG2 to "1", indicating the presence of a high humidity state of external atmosphere at least immediately before, as with the flag FLAG1.

Then steps S2709 and S2710 or S2711 execute a process for setting the heater 50 at a temperature higher than the ordinary set temperature. The step S2709 discriminates whether the heater temperature is higher or lower than the predetermined high temperature, and, if lower, a step S2710 activates the heater 50, or, if higher, a step S2711 deactivates the heater 50. As explained above, when the step S2707 identifies a high external humidity, the temperature of the heater 50 is selected higher than in the ordinary state, in order to accelerate the fixation of the recorded image.

The routine of humidity detection and control is terminated after the above-explained process.

If the discrimination in the step S2707 turns out negative, indicating a low external humidity, a step S2712 discriminates the state of the flag FLAG2. If it is "1", a step S2713 discriminates whether the external humidity has been lowered to a predetermined humidity, by checking the logic level of the signal line $l_6$. If it is "1", indicating that the external humidity has not yet been lowered to the predetermined humidity level, the routine of humidity detection and control is terminated, in order to wait for the lowering of the external humidity.

On the other hand, if the external atmosphere is in a low humidity state, below a predetermined level, the flag FLAG2 is reset to "0", and the sequence proceeds to a step S2715. Also if the discrimination in step S2712 turns out negative, the sequence proceeds to step S2715.

Steps S2715 and S2716 or S2717 execute a process of setting the heater 50 at an ordinary set temperature. The step S2715 discriminates whether the temperature of the heater 50 is higher or lower than the ordinary set temperature, and, if higher, the step S2716 deactivates the heater 50, or, if lower, the step S2717 activates the heater 50. The routine of humidity detection and control is terminated in this manner.

The above-explained routine for humidity detection and control is conducted for each recording of a scanning line, as shown in FIG. 10, thus controlling the temperature of the heater 50 according to the humidity in the external atmosphere and in the internal recording zone. In this manner the recorded image can be appropriately fixed, while the recording head is maintained in a dew-free state.

Also in the present embodiment, the above-explained routine for humidity detection and control may be included in the recording operation of a scanning line, as shown in FIG. 14.

Figure 27:
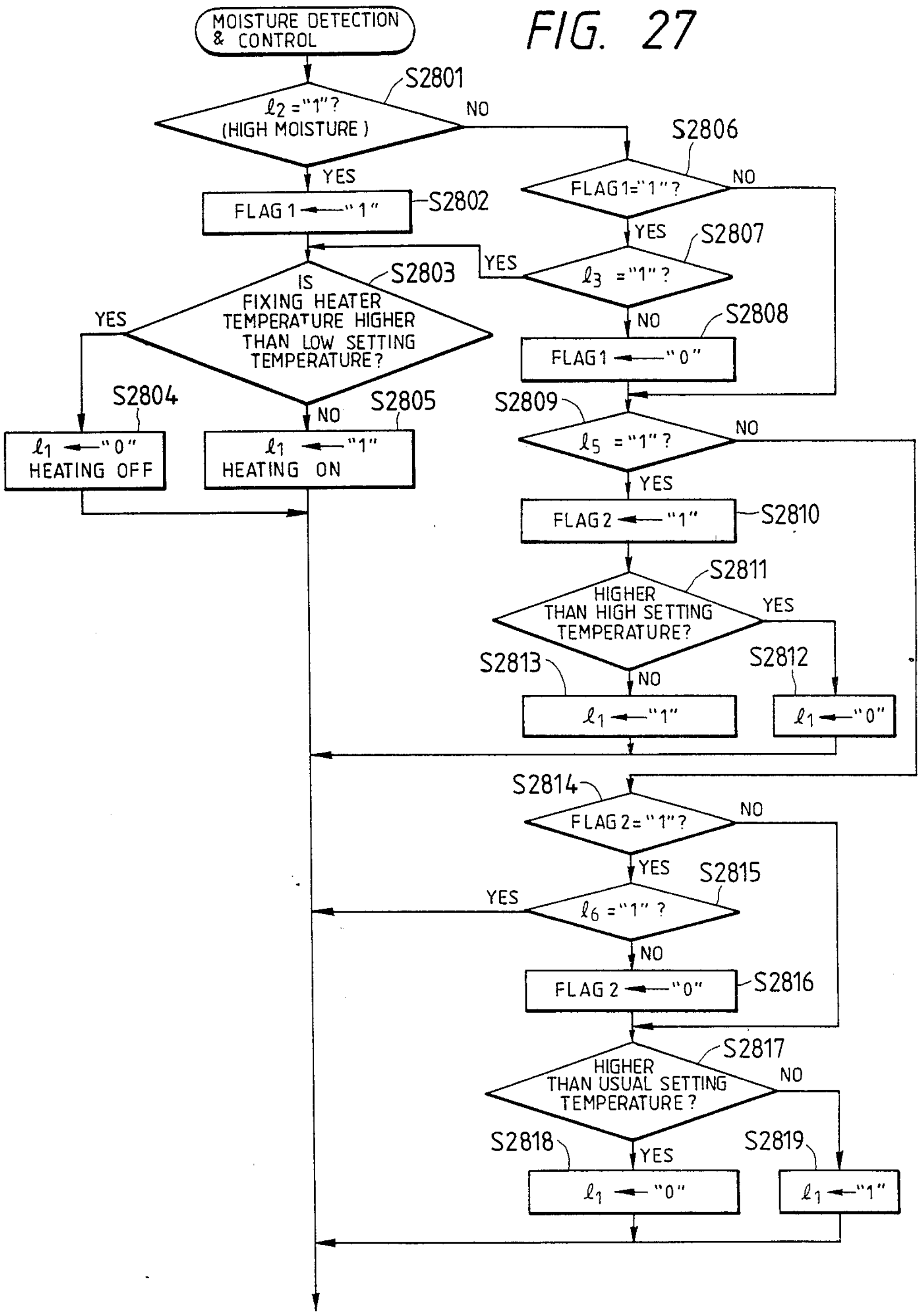
FIG. 27 is a flow chart showing an example of the process of humidity detection and control of the apparatus as shown in FIGS. 21 and 22.

FIG. 27 is a flow chart showing an embodiment of the process for humidity detection and control different from shown in FIG. 26.

It is different from the process shown in FIG. 26, in steps S2803 to S2805. When the recording zone is at a high humidity state, for example higher than 80%, the process shown in FIG. 26 merely deactivates the fixing heater 50, as represented by the step S2702. In the present embodiment, at first a step S2803 discriminates whether the temperature of the fixing heater 50 is higher or lower than a predertermined low temperature, and, if higher, a step S2804 deactivates the heater 50, or, if lower, a step S2805 activates the heater 50.

In this manner it is rendered possible to maintain a dew-free state while maintaining the fixing function by controlling the fixing heater 50 at a temperature lower than the ordinary set temperature, for example 75° C., so that more sophisticated anti-dewing can be achieved. Also a satisfactory fixing function can be realized even when the ambient conditions vary.

Also the low temperature state of the heater 50 may be controlled in plural levels according to the result of detection by the sensors.

[Seventh embodiment]

Figure 28:
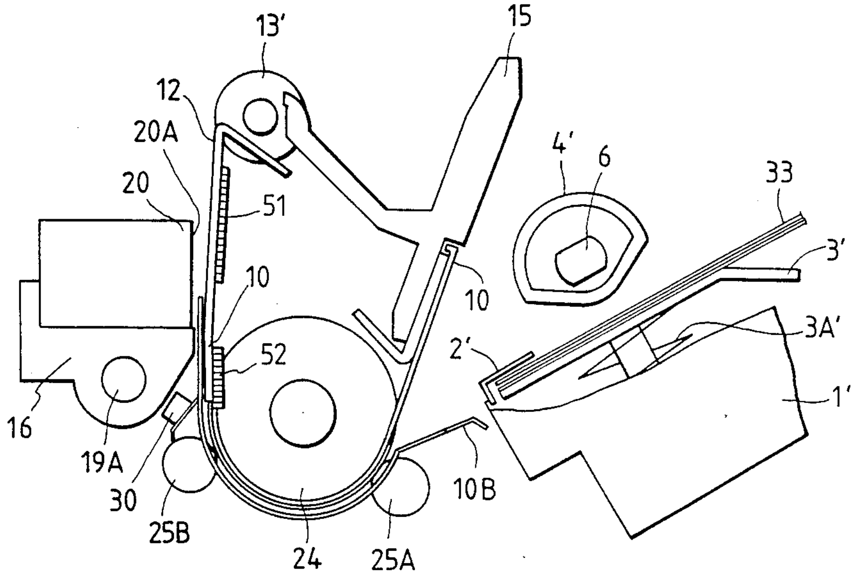
FIG. 28 is a schematic cross-sectional side view of an ink jet recording apparatus constituting a sixth embodiment.

FIG. 28 schematically shows a side sectional view of an ink jet recording apparatus of a seventh embodiment of the present invention, which is the same, in basic structure, as the foregoing embodiments but is different in that the recording head is integrally constructed with an ink tank and is rendered detachable from the carriage, and in the use of two humidity sensors and two fixing heaters, namely a first humidity sensor for detecting the humidity in the apparatus, a second humidity sensor for detecting the humidity in the external atmosphere, a first heater for heating the recording medium prior to recording, and a second heater for heating said medium after recording, for achieving finer control. The control function in the present embodiment is summarized in the following table:

| | | | | |
|---|---|---|---|---|
| 1st humidity sensor | high humid. | high humid. | low humid. | low humid. |
| 2nd humidity sensor | high humid. | low humid. | high humid. | low humid. |
| 1st heater | stop or low temp. | stop | low or high temp. | stop or low temp. |
| 2nd heater | stop or low temp. | Low temp. | high temp. | Low or high temp. |
| recording head | high temp. | high temp. | low temp. | low temp. |

In this manner the effective image fixation and prevention of dewing can be achieved under any humidity condition, in the case of the seventh embodiment.

The embodiments explained above can prevent or significantly reduce the dewing on the emission surface on which the orifice is provided, thus providing the following advantages.

The absence of uneven wetting on the emission surface stabilizes the direction and speed of emission of ink droplets from the orifices, thus enabling image recording of high quality. It is also possible to prevent deposition of dust or paper powder, which easily occurs when the emission surface is wetted by dewing.

The blade 31 shown in FIG. 2 is suitable for wiping off the overflowing ink from the orifices, caused for example in the suction from the orifices with the head recovery device 26 or by the vibration of head 20 at the end of the reciprocating stroke thereof, or the water drops generated by dewing, but repeated bladings may damage the emission surface, giving rise to an undesirable effect on the ink droplet emission. Such situation becomes a particular problem when the recording head 20 is formed by combining a plurality of members made of different materials and is subjected to a liquid-repellent treatment for obtaining uniform wetting on the emission surface (as disclosed by the present applicant in the Japanese patent applications 61-268493 - 61-248500). According to the present invention, the dewing on the emission surface is eliminated or significantly reduced, so that the wiping operations can be dispensed with or at least reduced in number.

As will be apparent from the foregoing description, the present invention is to control the temperatures of the recording head and the fixing heater, according to the humidity in the vicinity of the recording zone.

It is therefore rendered possible to prevent or significantly reduce the condensation of moisture, generated by heating, on the emission surface of the recording head, thereby stabilizing the direction and speed of emission of the ink droplets and the particle size thereof, thus achieving image recording of high quality.

In addition the present invention enables separate heating of the recording medium prior to and after the recording, under suitable temperature control.

It is therefore rendered possible to prevent or significantly reduce the condensation of moisture, generated by heating, on the emission surface of the recording head, thereby stabilizing the direction and speed of emission of the ink droplets and the particle size thereof, thus achieving image recording of high quality.

Also the image fixation can be accelerated as the moisture in the recording medium can be evaporated prior to the image recording.

The present invention further enables appropriate temperature control of the fixing heater, depending on the humidity in the recording zone and in the external atmosphere.

It is therefore rendered possible to prevent or significantly reduce the condensation of moisture, generated by heating, on the emission surface of the recording head, thereby stabilizing the direction and speed of emission of the ink droplets and the particle size thereof, thus achieving image recording of high quality.

Besides the image fixation is facilitated since the temperature of the fixing heater is varied according to the external humidity.

What is claimed is:

1. An ink jet recording apparatus comprising:

recording means for image recording by emitting ink onto a recording medium;

heater means for heating said recording medium;

humidity detector means for detecting ambient humidity; and control means for controlling the temperature of said heater means according to the humidity detected by said humidity detector means, said control means providing a first mode of operation wherein said heater means heats said recording medium at a first temperature and a second mode of operation wherein said heater means heats said recording medium at a second temperature lower than the first temperature, said control means providing the second mode when the detected humidity is higher than a predetermined humidity.

2. An ink jet recording apparatus according to claim 1, wherein said control means is adapted to terminate the heating of said heater means and to elevate the temperature of said recording means to a predetermined temperature when said detected humidity is a predetermined humidity, and to maintain the temperatures of said heater means and said recording means constant when said detected humidity is lower than said predetermined humidity.

3. An ink jet recording apparatus according to claim 1, wherein said control means is adapted to set the temperature of said heater means at a low temperature and to elevate the temperature of said recording means to a predetermined temperature when said detected humidity is a predetermined high humidity, and to set the heating temperature of said heater means higher than said low temperature and to set the temperature of said recording means lower than said predetermined temperature when said detected humidity is lower than said predetermined high humidity.

4. An ink jet recording apparatus according to claim 1, wherein said control means is adapted to interrupt the heating by said heater means, when the detected humidity is equal to or higher than a predetermined value.

5. An ink jet recording apparatus according to claim 1, wherein said control means is adapted to restart the heating by said heater means, when the detected humidity is lower than a predetermined value.

6. An ink jet recording apparatus according to claim 1, further comprising temperature detector means for detecting the temperature of said heater means.

7. An ink jet recording apparatus according to claim 1, wherein said heater means is provided in the vicinity of a transport path and is adapted to heat the recording medium prior to recording.

8. An ink jet recording apparatus according to claim 1, wherein said heater means is provided in the vicinity of a transport path and is adapted to heat the recording medium after recording.

9. An ink jet recording apparatus according to claim 1, wherein said humidity detector means is provided in the vicinity of a transport path for transporting said recording medium.

10. An ink jet recording apparatus according to claim 1, wherein said humidity detector means is provided in the vicinity of said recording means.

11. An ink jet recording apparatus according to claim 1, wherein said recording means comprises thermal energy generating means for generating thermal energy utilized in the ink emission.

12. An ink jet recording apparatus according to claim 1, wherein said recording means comprises an electrothermal converting element for generating thermal energy utilized in the ink emission.

13. An ink jet recording apparatus according to claim 1, wherein said recording means comprises an ink tank for containing ink, and is detachably mounted on a carriage.

14. An ink jet recording apparatus according to claim 1, wherein said recording means is a full-line type.

15. An ink jet recording apparatus according to claim 1, wherein said recording means is a recording head.

16. An ink jet recording apparatus according to claim 1, wherein said heater means is a heater.

17. An ink jet recording apparatus according to claim 1, wherein said humidity detector means is a detector.

18. An ink jet recording apparatus according to claim 1, wherein said control means is a controller.

19. An ink jet recording apparatus comprising:

recording means for emitting ink onto a recording medium;

first heater means for preheating a recording medium prior to recording by said recording means;

second heater means for heating said recording medium after recording by said recording means to fix the recorded image;

humidity detector means for detecting the humidity in the vicinity of a zone in which said recording means records onto said recording medium; and control means for controlling the heating temperatures of said first and second heater means according to the humidity detected by said humidity detector means, wherein said control means reduces the difference between the temperature at which said first heating means preheats said recording medium and the temperature of said recording means when the humidity detected by said humidity detecting means is higher than a predetermined humidity.

20. An ink jet recording apparatus according to claim 19, wherein said control means is adapted to terminate the heating of at least said first heater means when said detected humidity is a high humidity, and to regulate said first and second heater means respectively at predetermined heating temperatures when said detected humidity is a low humidity.

21. An ink jet recording apparatus according to claim 19, wherein said control means is adapted to regulate said first and second heater means at low heating temperature when said detected humidity is a high humidity, and to regulate said first and second heater means at predetermined heating temperatures higher than said low temperatures when said detected humidity is a low humidity.

22. An ink jet recording apparatus according to claim 19, wherein said recording means is a recording head.

23. An ink jet recording apparatus according to claim 19, wherein said heater means is a heater.

24. An ink jet recording apparatus according to claim 19, wherein said humidity detector means is a detector.

25. An ink jet recording apparatus according to claim 19, wherein said control means is a controller.

26. An ink jet recording apparatus provided with heater means for fixing the recorded image by heating a recording medium, comprising:

first humidity detector means for detecting the humidity in the vicinity of a zone in which said recording medium is subjected to recording;

second humidity detector means for detecting an environmental humidity at an area outside the vicinity of the zone in which said recording medium is subjected to recording; and control means for controlling the heating temperature of said heater means according to the humidities detected by said first and second humidity detector means, said control means providing a first mode of operation wherein said heater means heats said recording medium at a first temperature and a second mode of operation wherein said heater means heats said recording medium at a second temperature lower than the first temperature, said control means providing the second mode when the humidity detected by said first humidity detector means is higher than a predetermined humidity and providing the first mode when the humidity detected by said second humidity detector means is lower than the predetermined humidity.

27. An ink jet recording apparatus according to claim 26, wherein said control means is adapted to terminate the heating by said heater means when the humidity detected by said first humidity detector means is a high humidity, to regulate said heater means at a high heating temperature when the humidity detected by said first humidity detector means is a low humidity and the humidity detected by said second humidity detector means is a high humidity, and to regulate said heater means at a predetermiend heating temperature when the humidity detected by said second humidity detector means is a low humidity.

28. An ink jet recording apparatus according to claim 26, wherein said control means is adapted to regulate said heater means at a low heating temperature when the humidity detected by said first humidity detector means is a high humidity, to regulate said heater means at a high temperature when the humidity detected by said first humidity, detector means is a low humidity and the humidity detected by said second humidity detector means is a high humidity, and to regulate said heater means at a predetermined temperature higher than said low temperature but lower than said high temperature when the humidity detected by said second humidity detector means is a low humidity.

29. An ink jet recording apparatus according to claim 26 wherein the environmental humidity is one in the vicinity of a recording area.

30. An ink jet recording apparatus according to claim 26 wherein the environmental humidity is one in the vicinity of carrier means for carrying the recording medium.

31. An ink jet recording apparatus according to claim 26, wherein the environmental humidity is one in the vicinity of said recording means.

32. An ink jet recording apparatus according to claim 26, further comprising a third mode for heating said recording medium at a temperature higher than the first heating temperature condition.

33. An ink jet recording apparatus according to claim 26, wherein said recording means is a recording head.

34. An ink jet recording apparatus according to claim 26, wherein said heater means is a heater.

35. An ink jet recording apparatus according to claim 26, wherein said humidity detector means is a detector.

36. An ink jet recording apparatus according to claim 26, wherein said control means is a controller.

37. An ink jet recording apparatus comprising:

recording means for emitting ink for image formation on a recording medium;

heater means for heating a recording head;

humidity detector means for detecting humidity;

control means for controlling the heating temperature by said heater means according to the humidity detected by said humidity detector means; and said control means adapted to heat said recording head when the detected humidity is equal to or higher than a predetermined value.

38. An ink jet recording apparatus according to claim 37, wherein said control means is adapted to maintain the heating temperature of said recording head within a predetermined range when the detected humidity is lower than a predetermined value.

39. An ink jet recording apparatus according to claim 37, further comprising temperature detector means for detecting the temperature of said recording head.

40. An ink jet recording apparatus according to claim 39, wherein said temperature detector means comprises a positive-type temperature-dependent resistor.

41. An ink jet recording apparatus according to claim 37, wherein said heater means comprises a positive-type temperature-dependent resistor.

42. An ink jet recording apparatus according to claim 37, wherein said heater means is provided in the vicinity of the recording head.

43. An ink jet recording apparatus according to claim 37, further comprising second heater means for heating said recording medium.

44. An ink jet recording apparatus according to claim 43, further comprising second control means for controlling the heating temperature by said second heater means according to the humidity detected by said humidity detector means.

45. An ink jet recording apparatus according to claim 43, wherein said second control means is adapted to interrupt the heating by said second heater means, when the detected humidity is equal to or higher than a predetermined value.

46. An ink jet recording apparatus according to claim 45, wherein said second control means is adapted to restart the heating by said second heater means, when the detected humidity is lower than a predetermined value.

47. An ink jet recording apparatus according to claim 43, wherein said second control means is adapted to effect heating within a predetermined temperature range by said second heater means, when the detected humidity is equal to or higher than a predetermined value.

48. An ink jet recording apparatus according to claim 43, further comprising second temperature detector means.

49. An ink jet recording apparatus according to claim 43, wherein said second heater means is provided in the vicinity of a transport path and is adapted to heat the recording medium prior to recording.

50. An ink jet recording apparatus according to claim 43, wherein said second heater means is provided in the vicinity of a transport path and is adapted to heat the recording medium after recording.

51. An ink jet recording apparatus according to claim 37, wherein said humidity detector means is provided in the vicinity of a transport path for transporting said recording medium.

52. An ink jet recording apparatus according to claim 37, wherein said humidity detector means is provided in the vicinity of said recording head.

53. An ink jet recording apparatus according to claim 37, wherein said recording head comprises thermal energy generating means for generating thermal energy utilized in the ink emission.

54. An ink jet recording apparatus according to claim 37, wherein said recording head comprises an electrothermal converting member for generating thermal energy utilized in the ink emission.

55. An ink jet recording apparatus according to claim 37, wherein said recording head is provided integrally with an ink tank, and is detachably mounted on a carriage.

56. An ink jet recording apparatus according to claim 37, wherein said recording head is a full-line type head.

57. An ink jet recording apparatus according to claim 37, wherein said recording means is a recording head.

58. An ink jet recording apparatus according to claim 37, wherein said heater means is a heater.

59. An ink jet recording apparatus according to claim 37, wherein said humidity detector means is a detector.

60. An ink jet recording apparatus according to claim 37, wherein said control means is a controller.

61. A method for preventing dewing in an ink jet recording apparatus, which comprises using an ink jet recording apparatus provided with a recording head for emitting ink for image formation on a recording medium; first heater means for heating said recording head; second heater means for heating said recording medium; and humidity detector means for detecting humidity; and reducing the temperature difference between said recording head and said second heater means according to the humidity detected by said humidity detector means, thereby preventing dewing.

62. A method according to claim 61, wherein said recording head is heated when the detected humidity is equal to or higher than a predetermiend value.

63. A method according to claim 61, wherein said control means is adapted to maintain the heating temperature of said recording head within a predetermined temperature range when the detected humidity is lower than a predetermined value.

64. A method according to claim 61, wherein the heating by said second heater means is interrupted when the detected humidity is equal to or higher than a predetermined value.

65. A method according to claim 61, wherein the interrupted heating by said second heater means is restarted when the detected humidity is lower than a predetermined value.

66. A method according to claim 61, wherein the heating by said second heater means is conducted within a predetermined temperature range, when the detected humidity is equal to or higher than a predetermined value.

67. An ink jet recording apparatus comprising:

recording means for image recording by ink emission onto a recording medium;

heater means for heating said recording medium;

humidity detector means for detecting ambient humidity;

control means for controlling the heating temperature of said heater means according to the humidity detected by said humidity detector means, wherein said control means reduces the difference between a temperature of said recording means and a temperature at which said recording medium is preheated when the humidity detected by said humidity detector means is higher than a predetermined humidity.

68. An ink jet recording apparatus according to claim 67, wherein said recording means is a recording head.

69. An ink jet recording apparatus according to claim 67, wherein said heater means is a heater.

70. An ink jet recording apparatus according to claim 67, wherein said humidity detector means is a detector.

71. An ink jet recording apparatus according to claim 67, wherein said control means is a controller.

* * * * *

UNITED STATES PATENT AND TRADEMARK OFFICE
CERTIFICATE OF CORRECTION

PATENT NO. : 4,933,684
DATED : June 12, 1990
INVENTOR(S) : Shigemitsu Tasaki, et al.

It is certified that error appears in the above-identified patent and that said Letters Patent is hereby corrected as shown below: Title page:

At [56] REFERENCES CITED:

U.S. Patent Documents

"4,660,056 4/1978 Yokoi" should read --4,660,056 4/1987 Yokoi--.

SHEET 9 OF THE DRAWINGS:

In Figure 12, blocks S704-1 and S704, "THERMISTUR" should read --THERMISTOR--.

SHEET 11 OF THE DRAWINGS:

In Figure 14, block S23, "MOISTORE" should read --MOISTURE--.

SHEET 22 OF THE DRAWINGS:

In Figure 26, block S2703 "FEAG 1" should read --FLAG 1--.

COLUMN 1:

Line 21, "a a" should be deleted.

COLUMN 2:

Line 49, "peripheral" should read --periphery--.

UNITED STATES PATENT AND TRADEMARK OFFICE

CERTIFICATE OF CORRECTION

PATENT NO. : 4,933,684 Page 2 of 4
DATED : June 12, 1990
INVENTOR(S) : Shigemitsu Tasaki, et al.

It is certified that error appears in the above-identified patent and that said Letters Patent is hereby corrected as shown below:

COLUMN 3:

Line 55, "apparatus preferred" should read --apparatus of a preferred--.

COLUMN 4:

Line 16, "an" should be deleted.
Line 19, "an" should be deleted.
Line 49, "exmaple" should read --example--.

COLUMN 10:

Line 50, "operation, panel 102," should read --operation panel 102,--.

COLUMN 11:

Line 5, "position" should read --position.--.

COLUMN 13:

Line 5, "the setp S8" should read --step S8--.

COLUMN 14:

Line 18, "photocoupler T1" should read --photocoupler T1,--.

UNITED STATES PATENT AND TRADEMARK OFFICE
CERTIFICATE OF CORRECTION

PATENT NO. : 4,933,684 Page 3 of 4

DATED : June 12, 1990

INVENTOR(S) : Shigemitsu Tasaki, et al.

It is certified that error appears in the above-identified patent and that said Letters Patent is hereby corrected as shown below:

COLUMN 16:

Line 46, "on" should read --in--; and "in" should read --on--.

COLUMN 17:

Line 8, "predetermiend" should read --predetermined--.

COLUMN 18:

Line 47, "shown" should read --that shown--.

COLUMN 22:

Line 11, "perature" should read --peratures--.
Line 59, "predetermiend" should read --predetermined--.
Line 68, "humidity," should read --humidity--.

COLUMN 23:

Line 8, "26" should read --26,--.
Line 11, "26" should read --26,--.

UNITED STATES PATENT AND TRADEMARK OFFICE

CERTIFICATE OF CORRECTION

PATENT NO. : 4,933,684 Page 4 of 4

DATED : June 12, 1990

INVENTOR(S) : Shigemitsu Tasaki, et al.

It is certified that error appears in the above-identified patent and that said Letters Patent is hereby corrected as shown below:

COLUMN 24:

Line 16, "means." should read --means for detecting the temperature of said second heater means.--.

Line 68, "predetermiend" should read --predetermined--.

Signed and Sealed this

Twelfth Day of November, 1991

Attest:

HARRY F. MANBECK, JR.

*Attesting Officer*

*Commissioner of Patents and Trademarks*